United States Patent [19]
Yato

[11] Patent Number: 5,692,201
[45] Date of Patent: Nov. 25, 1997

[54] ELECTRIC POWER CONSUMPTION REDUCTION DEVICE

[75] Inventor: Hidenori Yato, Suwa, Japan

[73] Assignee: Seiko Epson Corporation, Tokyo, Japan

[21] Appl. No.: 503,002

[22] Filed: Jul. 17, 1995

[30] Foreign Application Priority Data

Jul. 20, 1994 [JP] Japan .................................. 6-168260
Jul. 14, 1995 [JP] Japan .................................. 7-201318

[51] Int. Cl.$^6$ .................................................. G06F 1/32
[52] U.S. Cl. ................................... 395/750; 395/556
[58] Field of Search ........................... 395/750, 560, 395/559, 556, 182.12; 323/265, 282, 284; 327/126

[56] References Cited

U.S. PATENT DOCUMENTS

| | | | |
|---|---|---|---|
| 5,126,695 | 6/1992 | Abe | 331/46 |
| 5,325,074 | 6/1994 | Suenaga | 331/46 |
| 5,426,755 | 6/1995 | Yokouchi et al. | 395/750 |
| 5,576,737 | 11/1996 | Isozaki | 345/211 |

FOREIGN PATENT DOCUMENTS

A-63-133221  6/1988  Japan .................. G06F 11/04

*Primary Examiner*—Glenn A. Auve
*Attorney, Agent, or Firm*—Oliff & Berridge

[57] ABSTRACT

A semiconductor device, microcomputer, or electronic equipment capable of switching internal power voltages in order to suppress the power consumption thereof can prevent erroneous operation of the internal circuitry by switching the level of the internal power voltage in a stepwise manner. A constant-voltage circuit that causes the generation of power voltages is capable of generating voltages of at least three levels. During the switching of the power voltages, a control circuit implements stepwise switching of the power voltages by causing the sequential output of the voltages in increasing or decreasing order of absolute value. Immediately after a switch of power voltage, the level of the signal on the signal line is determined to be at the same level as that before the switching even if a potential change in a signal line is delayed by more than a change in the threshold voltage of a digital circuit, and thus erroneous recognition of data, or rather data inversion, is prevented. This improves the reliability of the device.

26 Claims, 29 Drawing Sheets

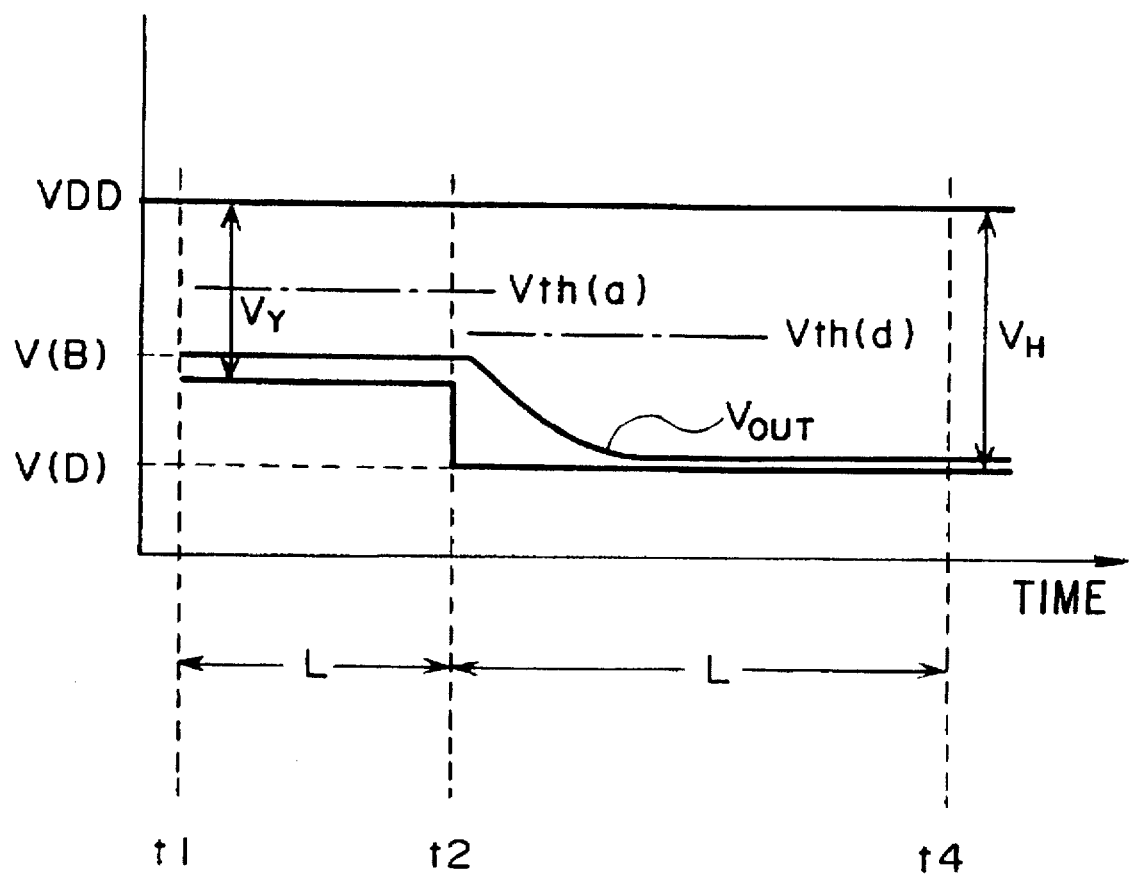

ELECTRIC POWER CONSUMPTION REDUCTION DEVICE

BACKGROUND OF THE INVENTION

1. Field of the Invention

This invention relates to a semiconductor device, a microcomputer, and electronic equipment.

2. Description of Related Art

In order to reduce the power consumption of a microcomputer that is used in a device such as battery-powered electronic equipment, the microcomputer is provided with a constant-voltage circuit in which is generated a voltage lower than the voltage supplied by the battery. The voltage supplied from this constant-voltage circuit is used as a power voltage (hereinafter called the internal power voltage).

To reduce the power consumption even further, a microcomputer of this type is often designed to utilize a function that switches this internal power voltage in accordance with the frequency of the clock that the microcomputer is using.

One example of this type of device is a twin-clock type of microcomputer that selectively uses a low-frequency clock and a high-frequency clock. In this microcomputer, the power consumption is reduced by using a low-level internal power voltage when the low-frequency clock is being used and a high-level internal power voltage when the high-frequency clock is being used. In this case, the power consumption is suppressed by suitable use of the low-level internal power voltage.

Note that the switching of the clock, as well as the associated switching of the internal power voltage, is implemented by software control.

This technique of switching the power voltage according to the frequency of the clock being used is disclosed in Japanese Patent Application Laid-Open No. 63-133221.

SUMMARY OF THE INVENTION

An objective of this invention is to prevent any problems such as erroneous operation in the circuitry that is provided for this switching of the power voltage, and thus improve reliability, in a microcomputer, semiconductor device, or electronic equipment that is required to have a lower power consumption.

Another objective of this invention is to guarantee the first objective, without increasing the load on the software. In other words, this objective of the invention is to remove problems such as erroneous operation in the circuitry that is provided for this switching of the power voltage, to thus achieve an increase in reliability.

A preferred form of a semiconductor device in accordance with this invention relates to a semiconductor device that is capable of switching power voltages of at least part of this semiconductor device, wherein a constant-voltage circuit that causes the generation of this power voltage generates at least three voltage levels, and a control device causes a sequential output of voltages of increasing or decreasing absolute value to implement stepwise switching of the power voltage.

This configuration makes it possible to implement fine switching of the power voltage in a stepwise fashion to the desired power voltage. Each step of the switching is performed through a secure range within which data inversion does not occur in the memory circuits. Thus data inversion does not occur, without adversely affecting reliability, even if a change in potential of a signal line should occur later than a change in the threshold of a digital circuit after the switching of the power voltage. This means that the difference (potential difference) between the low-level power voltage and the high-level power voltage can be increased, and thus the designer of the device can focus on both a lower power consumption and a faster speed (or a better driving capability).

It is preferable with this aspect of the invention that a timer device is used to provide timing control while the stepwise switching of the power voltage is being performed. This makes it possible for the stepwise switching of the power voltage to be performed reliably. Since a sequence of switching steps is performed under hardware-based time management, there is no danger of abrupt shifts in the power voltage occurring because of erroneous software commands.

It is also preferable that this aspect of the invention is provided with an adjustment device for adjusting the voltages (power voltages) generated by the constant-voltage circuit to any desired values. This enables a wider range of selection of the clock frequencies used in the semiconductor device and the load drive capabilities of the output circuitry, thus enabling a wider range of applications for the semiconductor device.

In another preferred form of the semiconductor device in accordance with this invention, a stepwise switching of the power voltage is performed for first and second gate circuits which are mutually connected by transmission paths and which mutually transfer signals (data). In this case, erroneous operation (the transfer of erroneous data) of the first and second gate circuits can be prevented.

It is preferable with this aspect of the invention that the gate circuits are configured of MOS transistors and that they have threshold voltages which vary depending on the power voltage that is currently in use. At least one of these threshold voltages is preferably set to a value approximately the same as one of the power voltages.

This configuration makes it possible to concentrate on fabricating a semiconductor device with a lower power consumption, but it does have the disadvantage that data inversion can easily occur at each switch in power voltage. However, application of the stepwise switching of the power voltage in accordance with this invention guarantees that data inversion is prevented, thus improving reliability.

It is preferable with this aspect of the invention that the switching of the power voltage accommodates both an operating mode that has excellent low power consumption characteristics and an operating mode that requires either high operating speeds or a high load drive capability. This enables the implementation of necessary functions, such as rapid signal processing, while suppressing unnecessary power consumption.

It is also preferable that this aspect of the invention is used in the control of portable electronic equipment operating by battery power (which includes various types of batteries, such as solar batteries). Portable electronic equipment is required to have a low power consumption, but provide many sophisticated functions. Thus application of this invention to such equipment has the effect of enabling improvements in functionality.

A preferred form of a microcomputer in accordance with this invention switches the power voltage in dependence on the frequency of the clock signal used by the CPU, and performs this switching of the power voltage in a stepwise fashion.

With a twin-clock type of microcomputer, for example, a microcomputer having sufficient data processing capability but a reduced power consumption can be implemented by using a low-level power voltage at the necessary lower limit when the frequency of the operating clock is low, and a high-level power voltage to enable all the required functions enabled by a higher frequency when it is high. Since the voltage switching is performed in a stepwise manner, no data inversion occurs and there is no loss of reliability.

It is preferable with this aspect of the invention that the configurations of the control circuit and voltage generation circuit are designed appropriately. For example, the control circuit preferably has a register for setting a CPU command (instruction). In such a case, the CPU need only set a command (instruction) in this register to switch the operating clock. The voltage generation circuit preferably has a constant-voltage circuit that uses differential pair circuits consisting of MOSFETs, as well as a buffer circuit of the same structure. There are no restrictions on the gate electrodes and gate isolation films of these MOSFETs. It is also preferable that two buffer circuits, with and without an offset between the input and output thereof, are used. This configuration makes it possible to obtain another voltage by adding an offset voltage to the output voltage of the constant-voltage circuit, by passing it through the buffer circuit with the input-output offset, thus making it easy to generate a number of power voltages that is larger than the number of constant-voltage circuits.

It is also preferable with this aspect of the invention that the control circuit is provided with a timer device and timing control signals are generated for the stepwise voltage switching. This ensures that stepwise voltage switching is performed reliably. Since a sequence of switching steps is performed under hardware-based time management, there is no danger of abrupt change in the power voltage occurring because of erroneous software commands.

It is further preferable which this aspect of the invention that the timer device is configured with a shift register that operates by a control clock signal. This makes it easy to obtain desired timing control signals by adjusting the period of the control clock.

It is still further preferable that this aspect of the invention is provided with an adjustment device for adjusting the voltages (power voltages) generated by the constant-voltage circuit to any desired values. This enables a wider range of selection of the clock frequencies used in the semiconductor device and the load drive capabilities of the output circuitry, thus enabling a wider range of applications for the semiconductor device.

It is yet further preferable that this aspect of the invention uses device for varying the resistance of a feedback resistor in a negative-feedback amplifier, as means for adjusting the power voltage. In such a case, any desired voltage could be generated by adjusting the resistance of the feedback resistor and thus adjusting the gain of the negative-feedback amplifier. This enables simple and accurate adjustment of the power voltage.

Another preferred form of a microcomputer in accordance with this invention has a control circuit that controls the clock switching and the stepwise switching of the power voltage in an interlocking manner. This makes it possible to switch both the clock that is used and the power voltage together, guaranteeing matching of the clock and power voltage and also making it possible to make the circuitry smaller.

It is preferable that the control circuit in this aspect of the invention is configured of a shift register. This makes it possible to obtain the necessary control signals at desired timing, with a simple circuit configuration.

It is also preferable that this aspect of the invention is configured in such a manner that the CPU need only issue a clock-switching instruction, and subsequently dedicated hardware or the like performs the series of operations necessary for the clock-switching and the stepwise switching of the power voltage. This therefore makes it possible to implement switching of both the clock and the power voltage by the CPU executing a single command from a program, thus reducing the load on the CPU and preventing erroneous switching caused by erroneous software commands.

It is further preferable that this aspect of the invention is configured in such a manner that the generation or non-generation of clock signals is controlled by the control circuit. This makes it possible to suppress the power consumption even further, by completely stopping the generation of the clock signals when they are not necessary.

It is still further preferable that this aspect of the invention is used in the control of portable electronic equipment operating by battery power (which includes various types of batteries, such as solar batteries). Portable electronic equipment is required to have a low power consumption, but provide many sophisticated functions. Thus application of this invention to such equipment has the effect of enabling improvements in functionality.

A preferred form of electronic equipment in accordance with this invention is electronic equipment that uses a semiconductor device to which the present invention is applied. This is particularly effective for electronic equipment that uses batteries (which includes various types of batteries, such as solar batteries) as a power supply. More powerful electronic equipment can be created by the incorporation of a semiconductor device in accordance with this invention into electronic equipment that is expected to provide both an extremely low power consumption and many sophisticated functions.

Another preferred form of electronic equipment in accordance with this invention is configured to use the above described microcomputer of this invention. This is particularly effective with electronic equipment that uses batteries (which includes various types of batteries, such as solar batteries) as a power supply, and makes it possible to supply more powerful electronic equipment.

BRIEF DESCRIPTION OF THE DRAWINGS

FIG. 31 is a further graph illustrative of techniques investigated by the present inventors, before devising this invention.

DETAILED DESCRIPTION OF PREFERRED EMBODIMENTS

In order to facilitate understanding of embodiments of this invention, the description below will first relate to details of investigations performed by the present inventors before devising this invention.

Demand has recently intensified for electronic equipment capable of consuming less power. To satisfy this demand, the present inventors have investigated how to reduce the value of a low-level internal power voltage even further (that is, reduce the absolute value of the voltage) in a twin-clock type of microcomputer in which the internal power voltage can be changed as previously described. These investigations have clarified the following points:

a. Immediately after a switch from a low-level internal power voltage to a high-level internal power voltage, data held in memory circuits such as registers may be inverted and erroneous operations may occur in these circuits. This reduces product reliability.

b. When focussing on reducing the power consumption, it is necessary to lower the level of the high-level internal power voltage (reduce the absolute value of the voltage) in order to use the low-level internal power voltage in which the absolute value has been compressed and also avoid the problem described above. However, this would lead to another problem in that the frequency of the high-frequency clock that can be used is severely restricted by this lowering in the high-level internal power voltage, impeding the high-speed operation of the microcomputer.

c. Therefore, it is extremely difficult to ensure reliability while satisfying both the quest for a lower power consumption and faster speeds for the circuitry.

The above points will now be discussed in more specific detail with the help of FIGS. 27 to 31.

Figure 27:
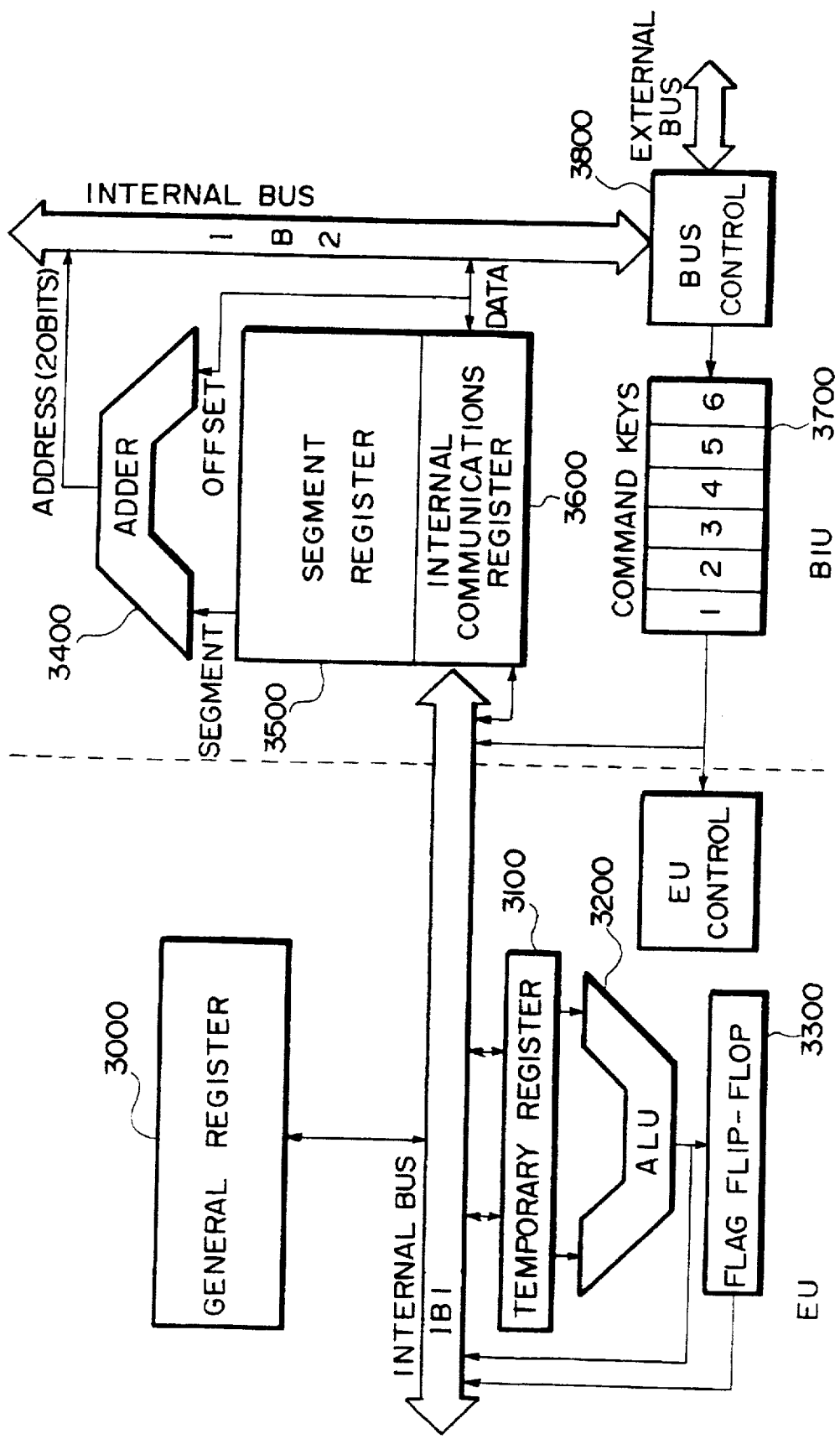
FIG. 27 shows an example of the configuration of the CPU of a microcomputer.

As shown in the example of FIG. 27, a large number of memory circuits (temporary data storage circuits) such as a flag flip-flop (flag F/F) 3300, a general register 3000 and a segment register 3500 are used in the central processing unit (CPU) of a microcomputer, and the data held in each of these memory circuits must always be held at the same level (either high or low) for a predetermined period.

Figure 28:
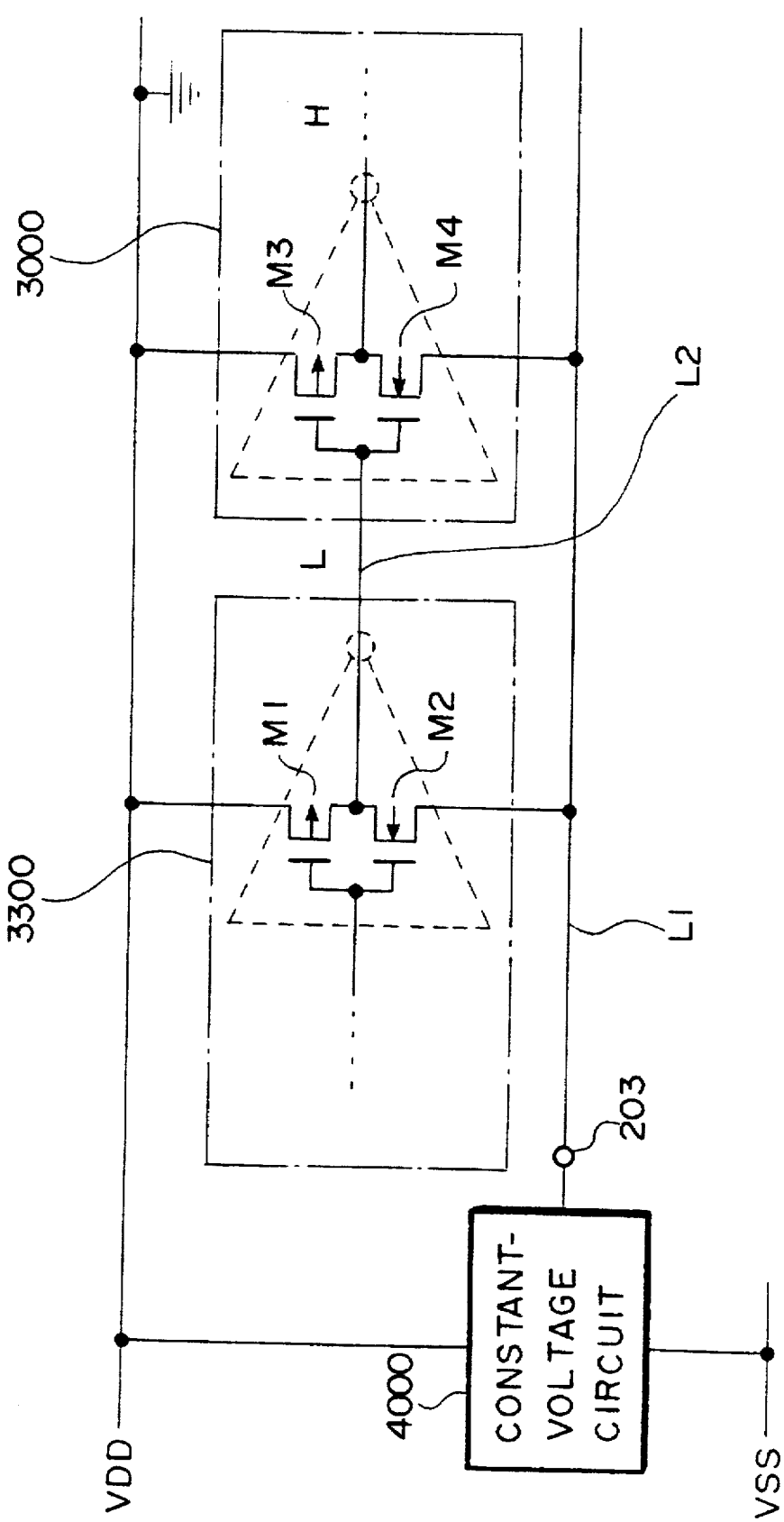
FIG. 28 shows some circuitry that operates on a voltage lower than an externally applied power voltage.

A simplified diagram of the configuration of an interface portion for transferring data between the flag flip-flop 3300 and the general register 3000 is shown in FIG. 28.

A constant-voltage circuit 4000 shown in FIG. 28 operates between VDD (ground) and VSS (which is a negative power supply, supplied from the outside of the CPU), and supplies an internal power voltage ($V_{203}$) to an internal power supply line L1 connected to a terminal 203.

An output buffer of the flag flip-flop 3300 consists of CMOS inverters configured of MOS transistors M1 and M2 and an input buffer of the general register 3000 consists of CMOS inverters configured of MOS transistors M3 and M4, and the theoretical threshold voltage thereof is set to a suitable level such as VSS/2.

Figure 29:
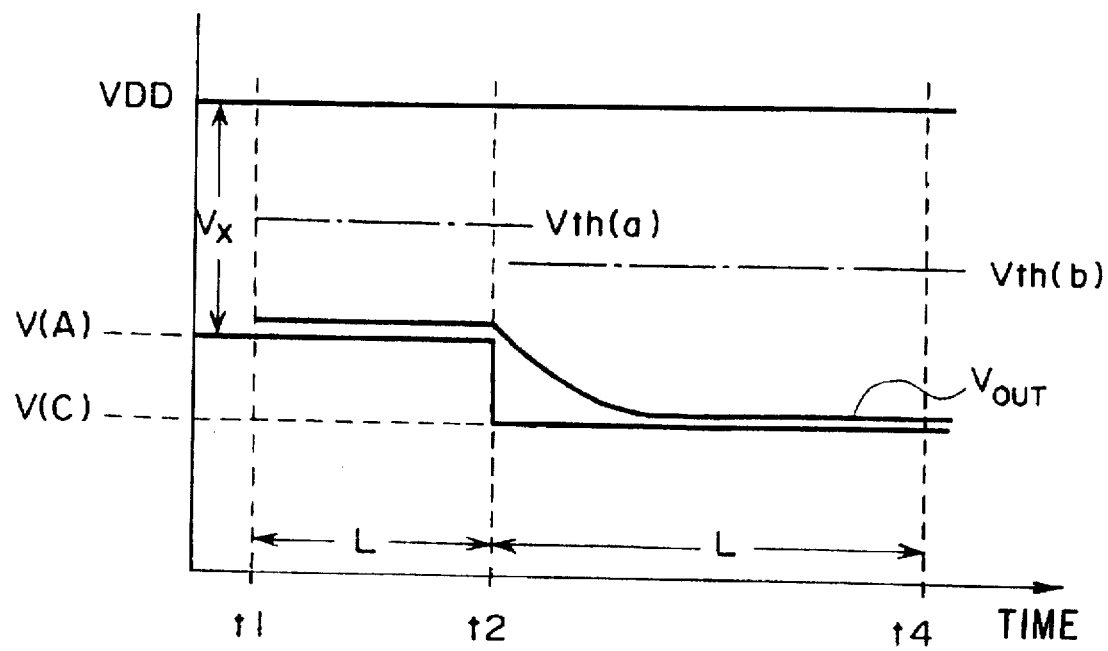
FIG. 29 is a graph illustrative of techniques investigated by the present inventors, before devising this invention.

The state during the switching of the internal power voltage with the configuration shown in FIG. 28 is shown in FIG. 29.

In this figure, V(A) is a low-level internal power voltage that is one of the voltages provided as the above described internal power voltage ($V_{203}$), and V(C) is a high-level internal power voltage thereof. Vth(a) is the threshold voltage of the CMOS inverters during operation at V(A), whereas Vth(b) is their threshold voltage during operation at V(C).

$V_{OUT}$ is the potential of a signal line L2 shown in FIG. 28. In the normal state, the potential of this signal line L2 corresponds to low-level data.

As shown in FIG. 29, when the internal power voltage has switched from V(A) to V(C) at a time t2, out is maintained at the low level.

Figure 30:
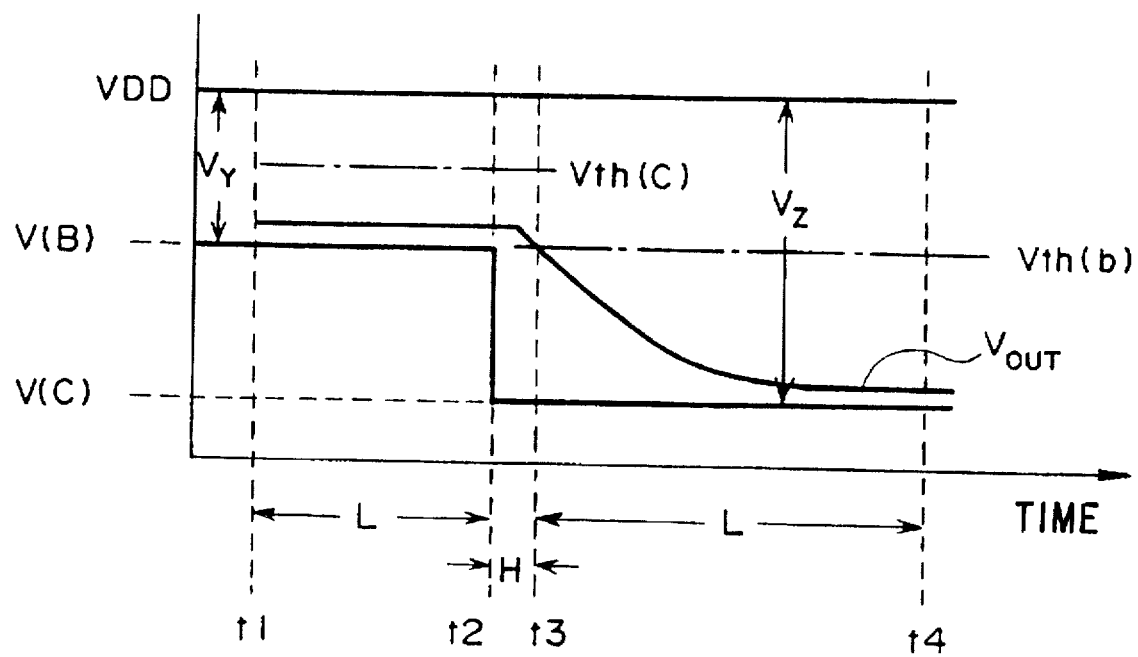
FIG. 30 is another graph illustrative of techniques investigated by the present inventors, before devising this invention.

The operation when the low-level internal power voltage range is further compressed from V(A) to V(B) in order to perform a further reduction in the power consumption, is shown in FIG. 30.

In this case, the threshold voltage Vth(b) is positioned close to the low-level internal power voltage V(B). Therefore, as shown in the figure, low-level data might be inverted to high from the time t2 to a time t3. This is because the threshold voltage changes immediately with the switch in internal power voltage but the change in the potential of the signal line L2 (FIG. 28) is affected by factors such as parasitic capacitance and is delayed thereby.

Thus, to avoid the problem shown in FIG. 30, it is necessary to reduce the high-level internal power voltage and reduce the amount of change in the internal power voltage, as shown in FIG. 31.

In other words, the high-level internal power voltage in FIG. 31 is made to be V(D) and the associated threshold voltage, Vth(d). Therefore, although the absolute value of the power voltage when the microcomputer is operating at high speed is $V_Z$ in FIG. 30, it is reduced to $V_H$ in FIG. 31.

This prevents data inversion associated with a switch in the internal power voltage. However, the frequency of the clock used during high-speed operation cannot be increased very far because of this reduction in the power voltage, and thus a new problem arises in that the processing capability of the microcomputer is reduced.

It is thus clear that it is currently difficult to satisfy both the quest for a lower power consumption and that for fast, reliable operations in an electronic device such as a microcomputer that is expected to have a low power consumption.

Note that the above described data inversion phenomenon is likely to occur in temporary memory circuits (latches) such as registers and memory circuits such as SRAM having flip-flop memory cells. It is also possible that the operating clock could be erroneously recognized in the same manner as in the above described data inversion, with the result that the circuits operating in synchronization with the clock, such as the frequency division circuit, could operate erroneously.

The present invention was devised on the basis of the above described experimental results obtained by the inventors.

Specific embodiments of this invention will now be described, with reference to the accompanying drawings.

First Embodiment

Figure 1:
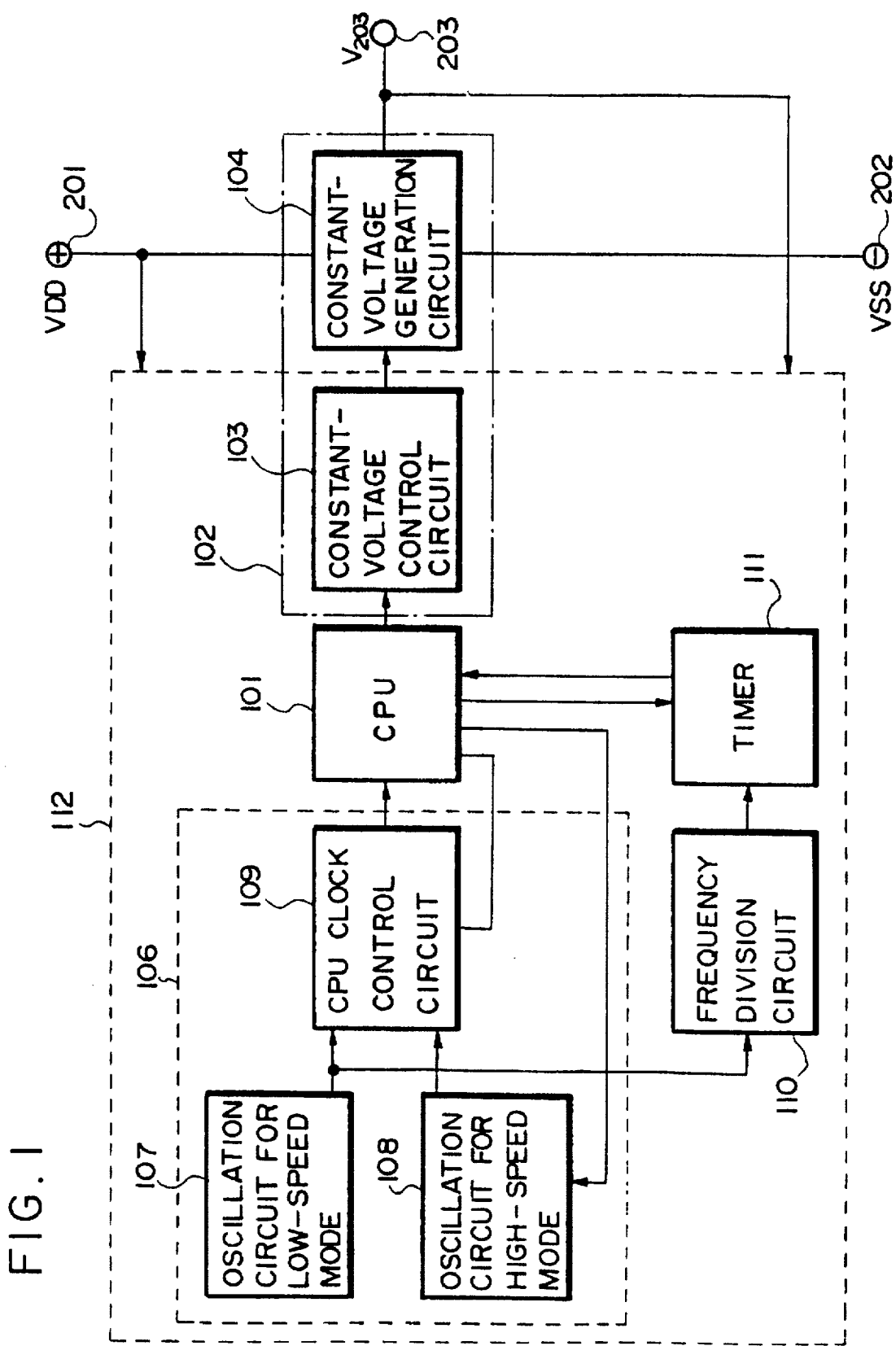
FIG. 1 is a block diagram of a first embodiment of this invention, giving an example of how the internal power voltage of a microcomputer is switched in a stepwise fashion.

A block diagram of the overall configuration of an embodiment of this invention applied to a microcomputer is shown in FIG. 1.

Overall Configuration

The entire microcomputer used for this embodiment runs on two power supplies: VDD (ground potential) and VSS (negative power supply). Note, however, that some of the circuits (such as a constant-voltage related circuitry 112) run on power supplies that are VDD (ground potential) and a power supply potential ($V_{203}$) of an absolute value less than VSS.

In other words, the constant-voltage related circuitry 112 runs on an internal power voltage of an absolute value that is less than that of the external power voltage supplied from outside the microcomputer, thus enabling a reduction in the total power consumption of the microcomputer. This constant-voltage related circuitry 112 is provided with a central processing unit (CPU) 101, a constant-voltage control circuit 103 (configured as part of a constant-voltage circuit 102), a frequency division circuit 110, and a timer 111.

These circuits will be described below.

The CPU 101 runs on an operating clock supplied from an oscillation circuit 106.

The constant-voltage circuit 102 is designed to generate an internal power supply potential $V_{203}$ of an absolute value less than that of VSS to a terminal 203, on the basis of external power supplies VDD and VSS (such as the output voltages of a battery) supplied to power supply terminals 201 and 202 from outside the microcomputer, and is provided with the constant-voltage control circuit 103 and a constant-voltage generation circuit 104.

The constant-voltage generation circuit 104 uses VDD and VSS that are supplied from outside the microcomputer as power supply potentials for operation, it generates a new power supply potential (that is, an internal power supply potential) $V_{203}$ necessary for its internal circuits, then supplies it to the constant-voltage related circuitry 112. The constant-voltage related circuitry 112 is one of the structural elements of the microcomputer that operates using this $V_{203}$.

Use of such an internal power voltage that is lower than the external power voltage makes it possible to design reductions in the power consumption of the microcomputer.

Note that VDD is a positive-polarity power supply and VSS is a negative-polarity power supply. This embodiment is configured such that VDD is at ground level and VSS is a voltage below 0 V. In this document, the internal power supply potential generated by the constant-voltage generation circuit 104, and of an absolute value less than that of VSS, is denoted by $V_{203}$.

The oscillation circuit 106 comprises an oscillation circuit 107 for low-speed mode that outputs a low-speed clock, an oscillation circuit 108 for high-speed mode that outputs a high-speed clock, and a CPU clock control circuit 109 that selects either the low-speed clock or the high-speed clock and supplies it to the CPU 101.

When the CPU is operating in high-speed mode, the high-speed clock is selected, when it is operating in low-speed mode, the low-speed clock is selected. In this case, the configuration is such that the absolute value of the internal power supply potential $V_{203}$ during operation in low-speed mode is lower than that during operation in high-speed mode, enabling a reduction of the power voltage and thus enabling a design with an even lower power consumption.

Thus, the magnitude of the output level ($V_{203}$) of the constant-voltage generation circuit 104 has to be varied in accordance with the frequency of the clock used by the CPU, or rather in accordance with the mode state of the oscillation circuit 106, but the previously mentioned constant-voltage control circuit 103 is provided to control this variation.

In other words, the constant-voltage control circuit 103 is designed to vary the level of the internal power supply potential $V_{203}$ in answer to commands from the CPU 101. This operation will be described in detail later.

The timer 111 is a circuit that uses an output clock of the frequency division circuit 110 to measure time, and the CPU 101 executes predetermined processing by using the timer 111 as required.

Configuration of Components

Specific examples of the configuration of FIG. 1 will now be described with reference to FIGS. 2 to 4.

Figure 2:
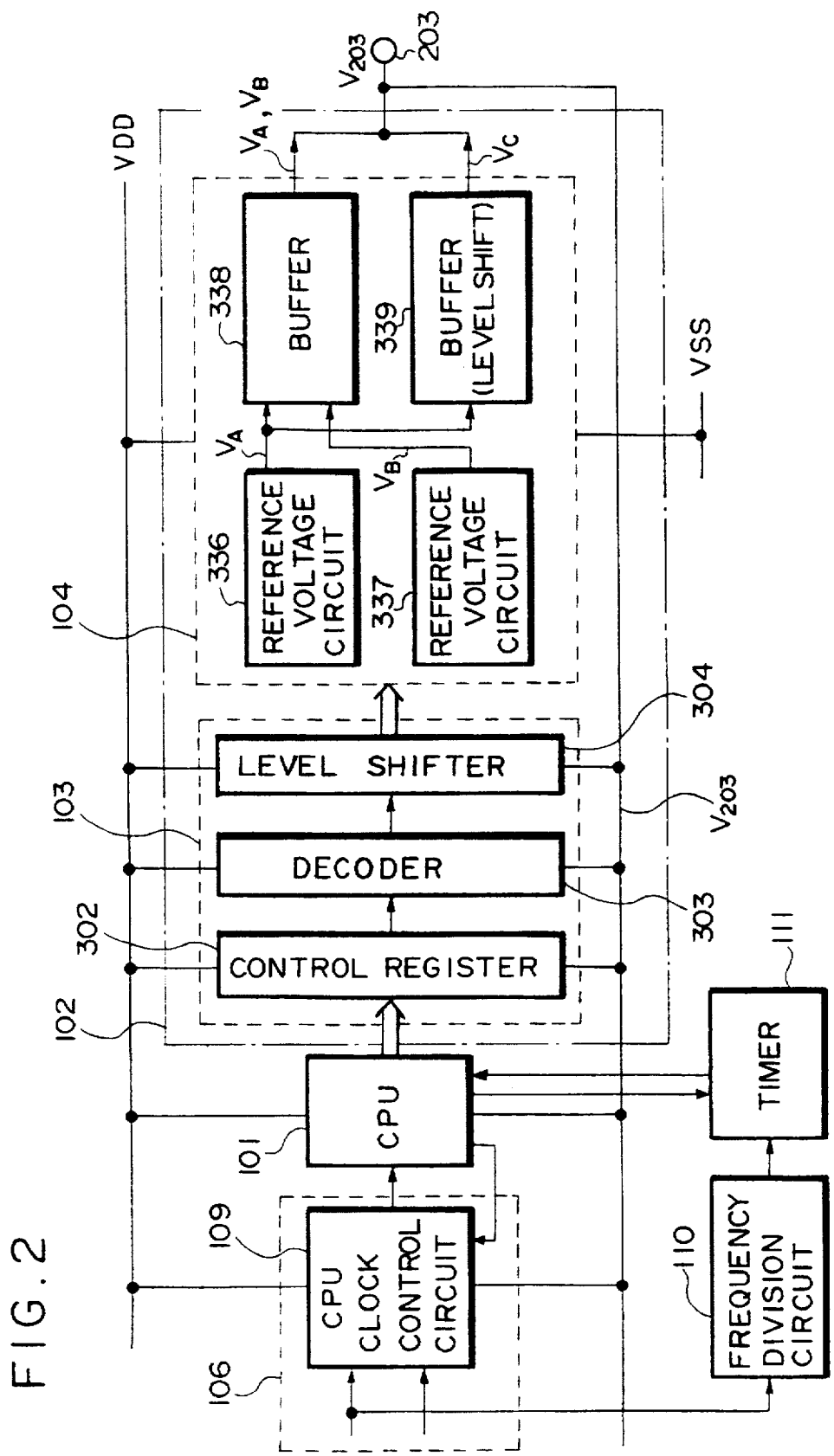
FIG. 2 is a block diagram of a more specific configurational example of the microcomputer shown in FIG. 1.

A specific configurational example of the constant-voltage circuit 102 (the constant-voltage control circuit 103 and the constant-voltage generation circuit 104) of FIG. 1 is shown in FIG. 2.

The constant-voltage control circuit 103 comprises a control register 302 for setting a conversion command for the clock to be used, which is issued from the CPU 101, a decoder 303 that decodes the command set in the control register 302, and a level shifter 304 that causes the voltage level of the output signal to shift.

The constant-voltage generation circuit 104 comprises a first reference voltage circuit (output voltage: $V_A$) 336, a second reference voltage circuit (output voltage: $V_B$) 337, a first buffer circuit (voltage follower) 338 with no offset between the input and output thereof, and a second buffer circuit 339 which has an offset ($V_{OFF}$) between the input and output thereof, giving it a level-shifting function.

The first and second reference voltage circuits 336 and 337 output temperature-compensated constant voltages which are not dependent on the ambient temperature. Each is configured of a band-gap reference circuits or circuits that make use of work function gap of MOS transistors.

The output voltages ($V_A$ and $V_B$) of the first and second reference voltage circuits 336 and 337 are input to the first buffer circuit 338, and one of these two voltages is selectively output therefrom.

The output voltage $V_A$ of the first reference voltage circuit 336 is input to the second buffer circuit 339, and a voltage $V_C$ that is this voltage $V_A$ plus the previously described input-output offset voltage ($V_{OFF}$) is output therefrom ($V_C = V_A + V_{OFF}$). Therefore, this circuit makes it easy to generate a number of constant voltages of different values that is larger than the number of reference voltage circuits.

A specific example of the configuration of this constant-voltage generation circuit 104 will now be described with reference to FIG. 3.

Figure 3:
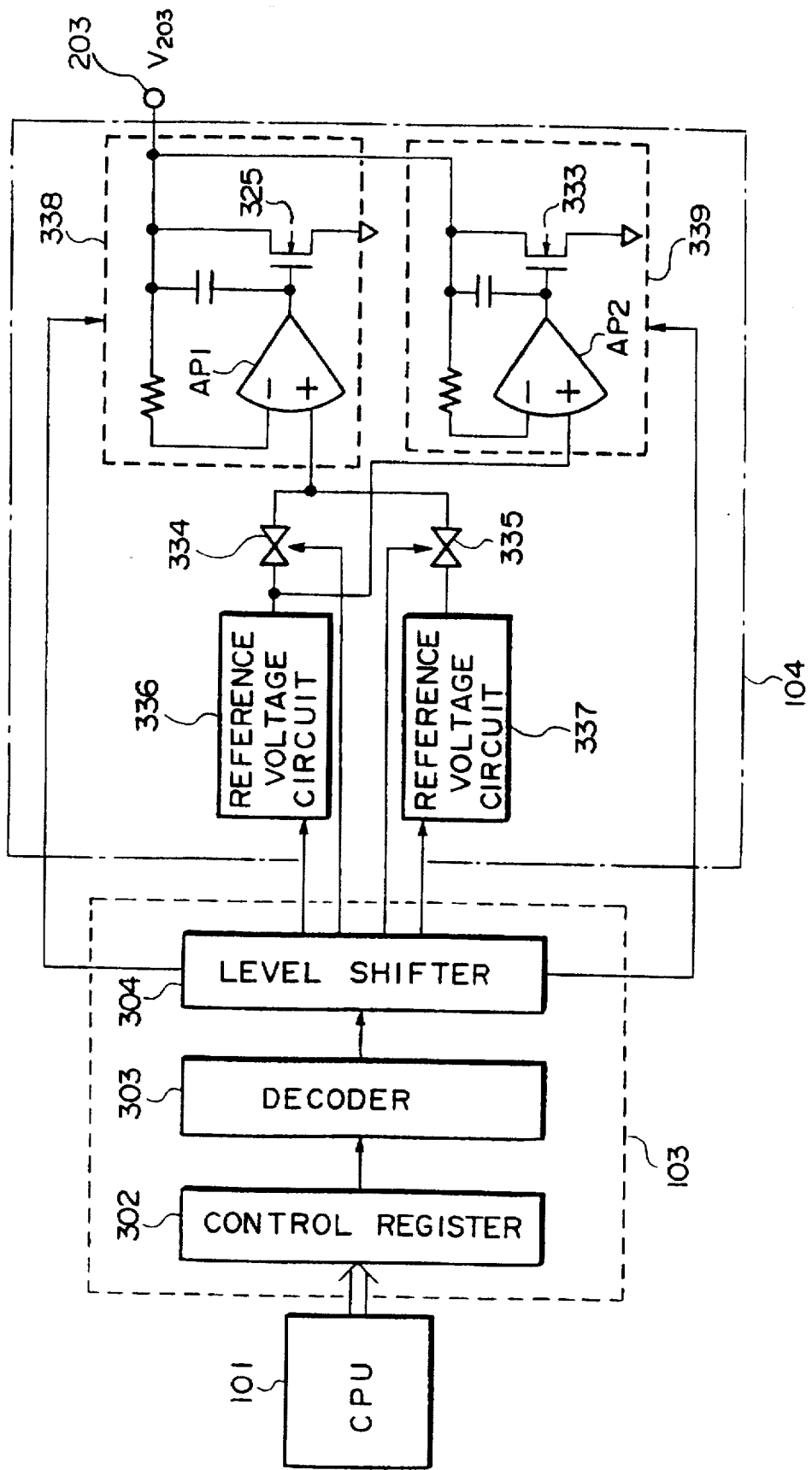
FIG. 3 is a block diagram of a more specific configurational example of the microcomputer shown in FIG. 2.

As shown in FIG. 3, each of the first and second buffer circuits 338 and 339 that configure the constant-voltage generation circuit 104 comprises a differential pair circuit AP1 or AP2 that uses a MOS transistor, as well as an output-stage transistor 325 or 333.

Transmission gate circuits 334 and 335 are provided between the first buffer circuit 338 and the first and second reference voltage circuits 336 and 337, respectively, to control the transfer of signals.

Figure 4:
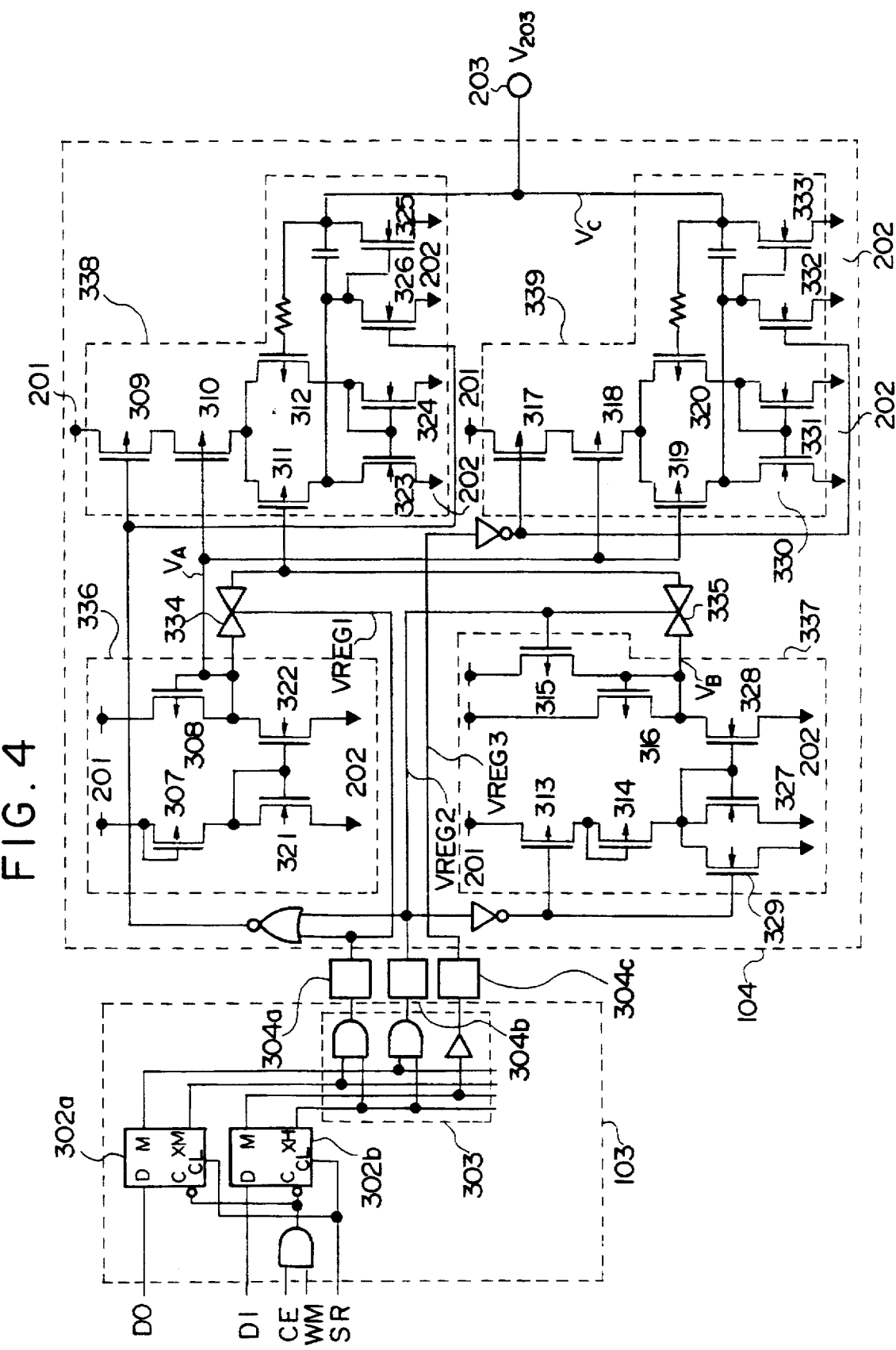
FIG. 4 is a block diagram of a more specific configurational example of the microcomputer shown in FIG. 3.

More specific circuit examples of the constant-voltage control circuit 103 and the constant-voltage generation circuit 104 shown in FIG. 3 are shown in FIG. 4.

Two control registers 302a and 302b are provided in the constant-voltage control circuit 103. Each of these control registers 302a and 302b is configured of a D flip-flop with a reset terminal (CL). Inputs to these two control registers 302a and 302b include D0 and D1 which are signals from the data bus for transferring settings data, CE which is a level selecting signal for selecting the address of a constant-voltage level control register, WM which is a write-memory signal from the CPU 101 shown in FIGS. 1 to 3, and SR which is a system reset signal for the microcomputer. All signals from the data bus are written in synchronization with the WM signal.

Data that has been set in the two control registers 302a and 302b is decoded by the decoder 303, then the resultant decoded signals are passed to the constant-voltage generation circuit 104 through level-shifter circuits 304a, 304b, and 304c. These signals (VREG1, VREG2, and VREG3) are used to specify (i.e., control) the voltage generated by the constant-voltage generation circuit 104.

Note that the signals are passed through the level-shifter circuits 304a, 304b, and 304c because the constant-voltage control circuit 103 operates at the internal power supply potential $V_{203}$ on the one hand but the constant-voltage generation circuit 104 operates by using $V_{SS}$. Thus there is a difference between the high and low levels in the circuitry, making necessary to adjust by shifting the levels.

The first reference voltage circuit 336 in the constant-voltage generation circuit 104 is configured of PMOS transistors 307 and 308 that form a differential pair and NMOS transistors 321 and 322 that create a current-mirror load.

The second reference voltage circuit 337 is configured of PMOS transistors 314 and 316 that form a differential pair, NMOS transistors 327 and 328 that create a current-mirror load, and switching transistors 313, 315, and 329 for control.

The first output buffer circuit 338 is configured of PMOS transistors 311 and 312 that form a differential pair, NMOS transistors 323 and 324 that create a current-mirror load, a PMOS transistor 310 that functions to supply current to the differential pair, an output-stage transistor 325, and switching transistors 309 and 326 for control.

The second output buffer circuit 339 has the same configuration as the first output buffer circuit 338, namely: PMOS transistors 319 and 320 that form a differential pair, NMOS transistors 330 and 331 that create a current-mirror load, a PMOS transistor 318 that functions to supply current to the differential pair, an output-stage transistor 333 and switching transistors 317 and 332 for control.

Note that reference numbers 334 and 335 denote transmission gates.

The operation of switching the internal power supply potential ($V_{203}$) in the circuit of FIG. 4 will now be described, using the timing chart shown in FIG. 5.

When the CPU 101 sets data in the control registers 302a and 302b within the constant-voltage control circuit 103, the levels of VREG1, VREG2, and VREG3 (control signals for the voltages generated from the constant-voltage generation circuit 104) change as shown in Table 1 (note that, for convenience in Table 1, the control register 302a is abbreviated to Cont. Reg. a and the control register 302b is abbreviated to Cont. Reg. b).

TABLE 1

| Cont. Reg. a | Cont. Reg. b | VREG1 | VREG2 | VREG3 |
|---|---|---|---|---|
| 0 | 0 | 1 | 0 | 0 |
| 1 | 0 | 0 | 1 | 0 |
| 0 | 1 | 0 | 0 | 1 |
| 1 | 1 | 0 | 0 | 1 |

The configuration is such that $V_{203}$ is −1.05 (V) when control signal VREG1 is 1, it is −1.55 (V) when VREG2 is 1, and it is −2.10 (V) when VREG3 is 1.

The generation of these different versions of the internal power supply potential $V_{203}$ is described below.

The description first concerns the output voltage $V_A$ of the reference voltage circuit 336.

If the threshold voltage and current gain of each of the MOS transistors 307, 308, 321, and 322 are assumed to be V307 and β307, V308 and β308, V321 and β321, and V322 and β322, respectively, the output voltage $V_A$ is expressed by the following equation:

$$V_A = -[V308 - V307 \times \{(\beta 307 \times \beta 322)/\beta(308 \times \beta 321)\}^{1/2}] \quad \ldots (1)$$

The current gain 13 of the reference voltage circuit 336 is expressed by the following equation:

$$\beta = \{\mu \times (\epsilon 0) \times (\epsilon 0X)/(tOX)\} \times (W/L) \qquad \ldots (2)$$

In Equation 2, μ is the carrier mobility, ∈0 is the permittivity in vacuum, ∈0X is the relative permittivity of the gate oxide layer, W is the transistor gate width, and L is the transistor gate length.

If β307 is now set to be equal to β308 and β321 equal to β322, Equation 1 can be used to express the output voltage $V_A$ as a difference between V308 and V307 (the threshold voltages) as follows:

$$V_A = -(V308 - V307) \qquad \ldots (3)$$

The reference voltage circuit 336 is configured in such a manner that it outputs a temperature-compensated constant voltage $V_A$ (=−1.05 V) by making this difference between threshold voltages equal to a work function gap of the MOS transistors.

The temperature-compensated output voltage $V_B$ (=−1.55 V) of the reference voltage generation circuit 337 can be also output by adjusting the current gain β thereof on the basis of equations similar to Equations 1 to 3 as used in the explanation of the first reference voltage circuit 336.

The constant voltages $V_A$ and $V_B$ that are created in the above described manner are supplied to the first buffer 338 and the second buffer 339 of the next stage.

The first buffer 338 does not have an offset between the input and output thereof, but the second buffer 339 is provided with an offset of 1.05 V between the input and output thereof.

The above described constant voltage $V_A$ (=−1.05 V) or $V_B$ (=−1.55 V) is input to the first buffer 338 and, as a result, an internal power supply potential ($V_{203}$) of either −1.05 V or −1.55 V is generated at the terminal 203.

The constant voltage $V_A$ (=−1.05 V) is input to the second buffer 339. In this case, an offset of −1.05 V is provided between input and output, so that the output voltage $V_C$ is −(1.05 +1.05) V, in other words, −2.10 V.

Switching between $V_A$ (=−1.05 V) and $V_B$ (=−1.55 V) is performed by the transmission gates 334 and 335.

When either $V_A$ (=−1.05 V) or $V_B$ (=−1.55 V) is being output, the NMOS transistor 326 is turned off whereas the NMOS transistor 332 is turned on. This means that the output-stage transistor 325 is used as an output driver. When $V_C$ (=−2.10 V) is being output, the NMOS transistor 326 is turned on whereas the NMOS transistor 332 is turned off, so that in this case it is the output-stage transistor 333 that is used as the output driver.

In this manner, the constant voltages $V_A$, $V_B$, and $V_C$ are obtained.

Figure 5:
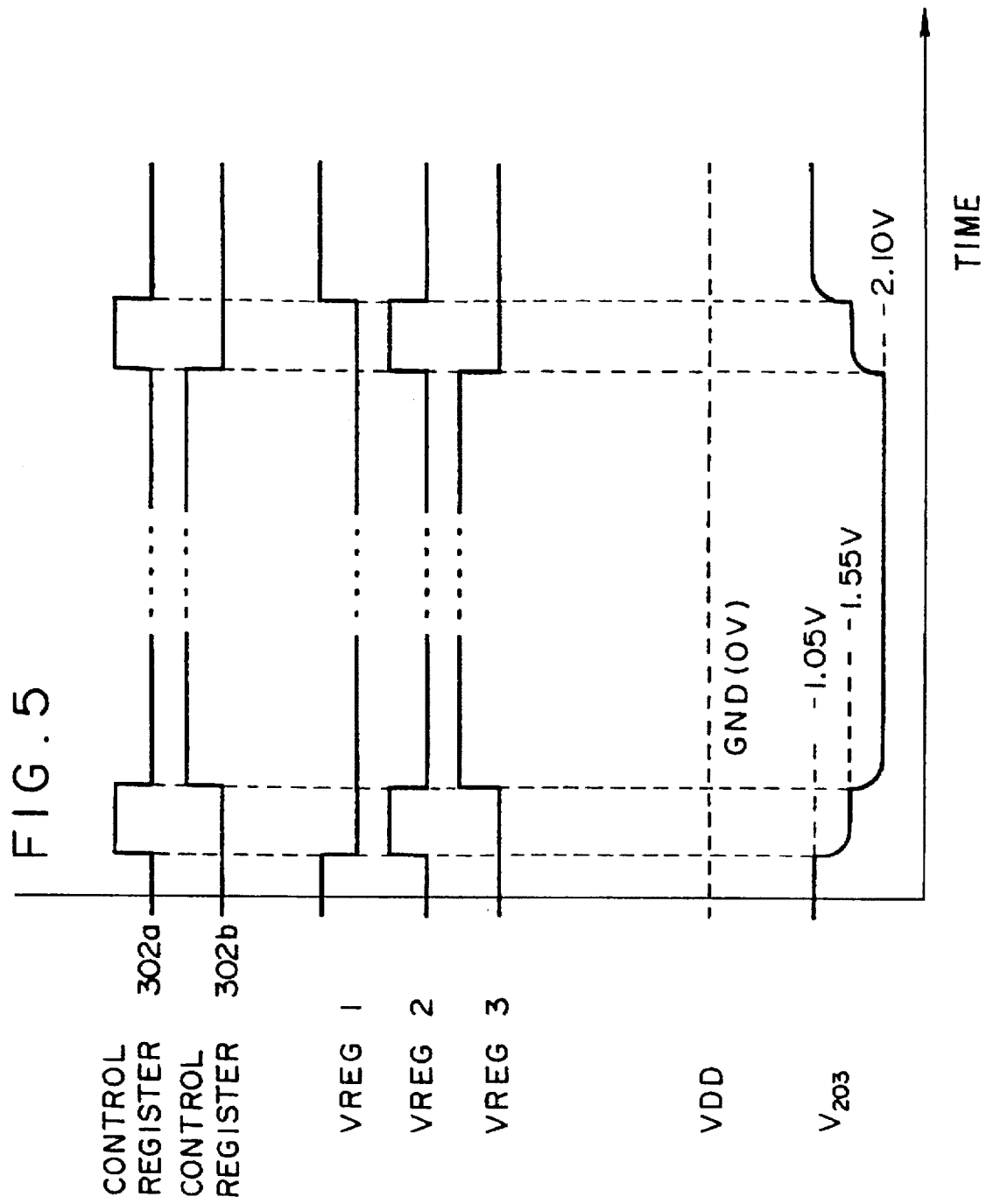
FIG. 5 is a timing chart illustrative of the main operation of the electronic circuitry of FIG. 4.

Starting from a state in which the data in both of the control registers 302a and 302b is zero, if the conditions are changed in such a manner that the data in the control register 302a alone is set to 1 and then the data in the control register 302b alone is set to 1, the internal power supply potential $V_{203}$ will accordingly switch in steps from −1.05 V to −1.55 V and then to −2.10 V, as shown in FIG. 5. Since VDD is fixed to ground, this stepwise switching will gradually increase the internal power voltage.

This switching of the internal power supply potential is designed to be implemented in an interlocking manner when the clock used by the CPU 101 of FIG. 1 is changed (e.g., when the low-speed clock changes to the high-speed clock).

In other words, when the circuit shown in FIG. 1 switches from a state in which the oscillation circuit 107 for low-speed mode is used to a state in which the oscillation circuit 108 for high-speed mode is used, the CPU 101 first causes the internal power voltage to increase in steps as described above. After the voltage has finally stabilized, the oscillation circuit 108 for high-speed mode is turned on and the high-speed oscillation clock is input to the CPU 101 through the CPU clock control circuit 109.

The opposite occurs during a switch from the high-speed clock to the low-speed clock. In other words, from a state in which the data in the control register 302b alone is set to 1, the CPU 101 sequentially sets the data in the control register 302a alone to 1, then sets the data in both of the control register 302a to zero, as shown in FIG. 5. In consequence, the internal power supply potential $V_{203}$ switches sequentially in steps from −2.10 V to −1.55 V and then to −1.05 V. This lowers the internal power voltage. After the voltage has finally stabilized, the oscillation circuit 107 for low-speed mode is turned on and the low-speed oscillation clock is input to the CPU 101 through the CPU clock control circuit 109.

Figure 6:
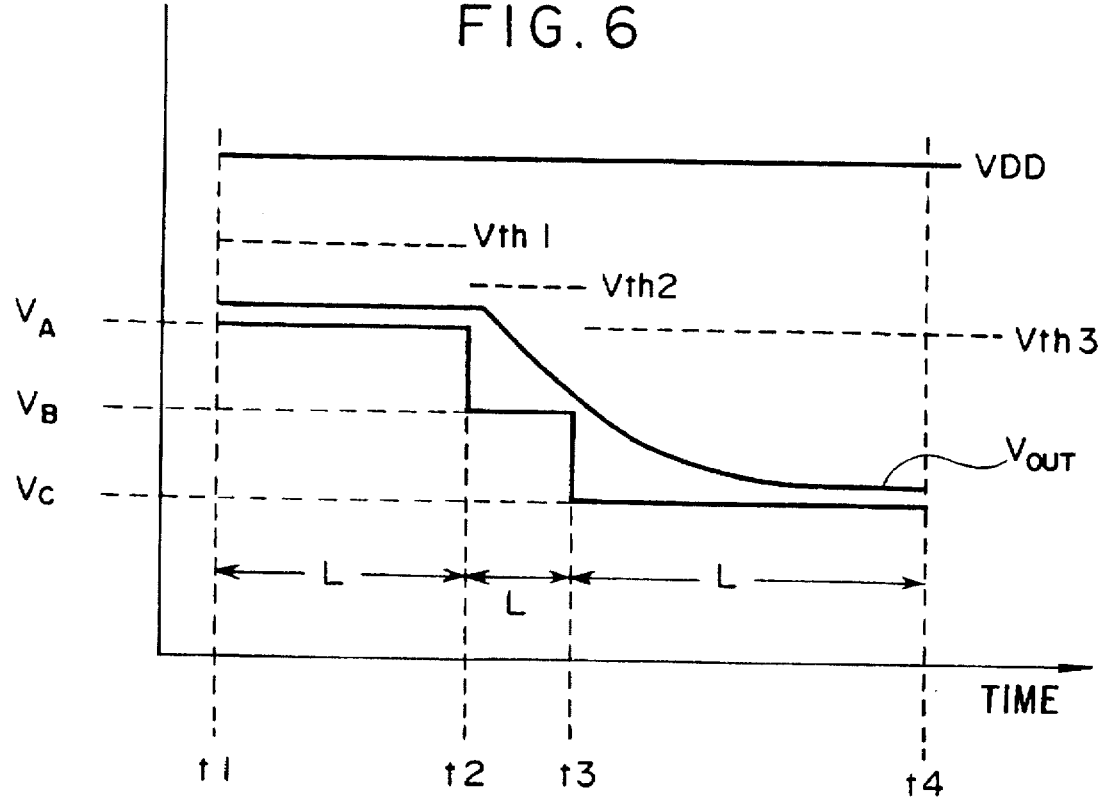
FIG. 6 is a graph illustrative of the effects of the microcomputers shown in FIGS. 1 to 5.

This stepwise switching of the power voltage prevents any inversion of stored data associated with the switching of the power voltage, as shown in FIG. 6. That is, a switching of the power voltage under the same conditions as those of FIG. 30 will not cause the level of the stored data to cross the threshold voltage, and thus the stored data will be maintained at the same high or low level before and after the switching of the power voltage.

Thus the configuration of this embodiment enables both the requirements of high-speed operation and low power consumption to be satisfied, without sacrificing the reliability of the microcomputer.

Note that the configuration of this embodiment was described herein in such a manner that the constant-voltage circuit generates three voltage levels and the voltages are changed in a stepwise manner. However, it should be clear to those skilled in the art that this embodiment should not be limited to this configuration; the present invention can equally well be implemented by an example in which four voltage levels are generated in a similar manner, with the voltages being changed in a stepwise manner therebetween.

From the point of view of preventing abrupt changes in the power voltage, it is better to have many intermediate voltage levels. Step-less, analog-like changes would be preferable. However, if a large number of intermediate levels were set, the circuit area would increase, and thus it is not feasible to increase the number without limit.

If the above configuration is used with VSS at ground and VDD being a positive power supply (a voltage source greater than 0 V), there is a danger that inversion of high data and low data could occur. Therefore, in this case too, abnormal and erroneous operation can be prevented in a similar manner by generating voltage levels in at least two steps from a constant-voltage circuit capable of generating at least three different output voltages.

Second Embodiment

A second embodiment of this invention will now be described with reference to FIG. 7.

This embodiment is characterized in that a dedicated timer 105 is provided in the constant-voltage circuit 102. The configuration of the constant-voltage generation circuit 104 is the same as that shown in FIGS. 1 to 4.

With the configuration of this embodiment, the CPU 101 sets a clock-switching command in a control register (reference number 302 in FIGS. 2 to 4), then the constant-voltage control circuit 103 controls the constant-voltage generation circuit 104 while using the dedicated timer 105, to automatically switch the internal power supply potential $V_{203}$ in a stepwise fashion.

Therefore, not only can the load on the CPU 101 be reduced, but abrupt changes in the internal power supply potential caused by erroneous commands can be prevented.

Figure 8:
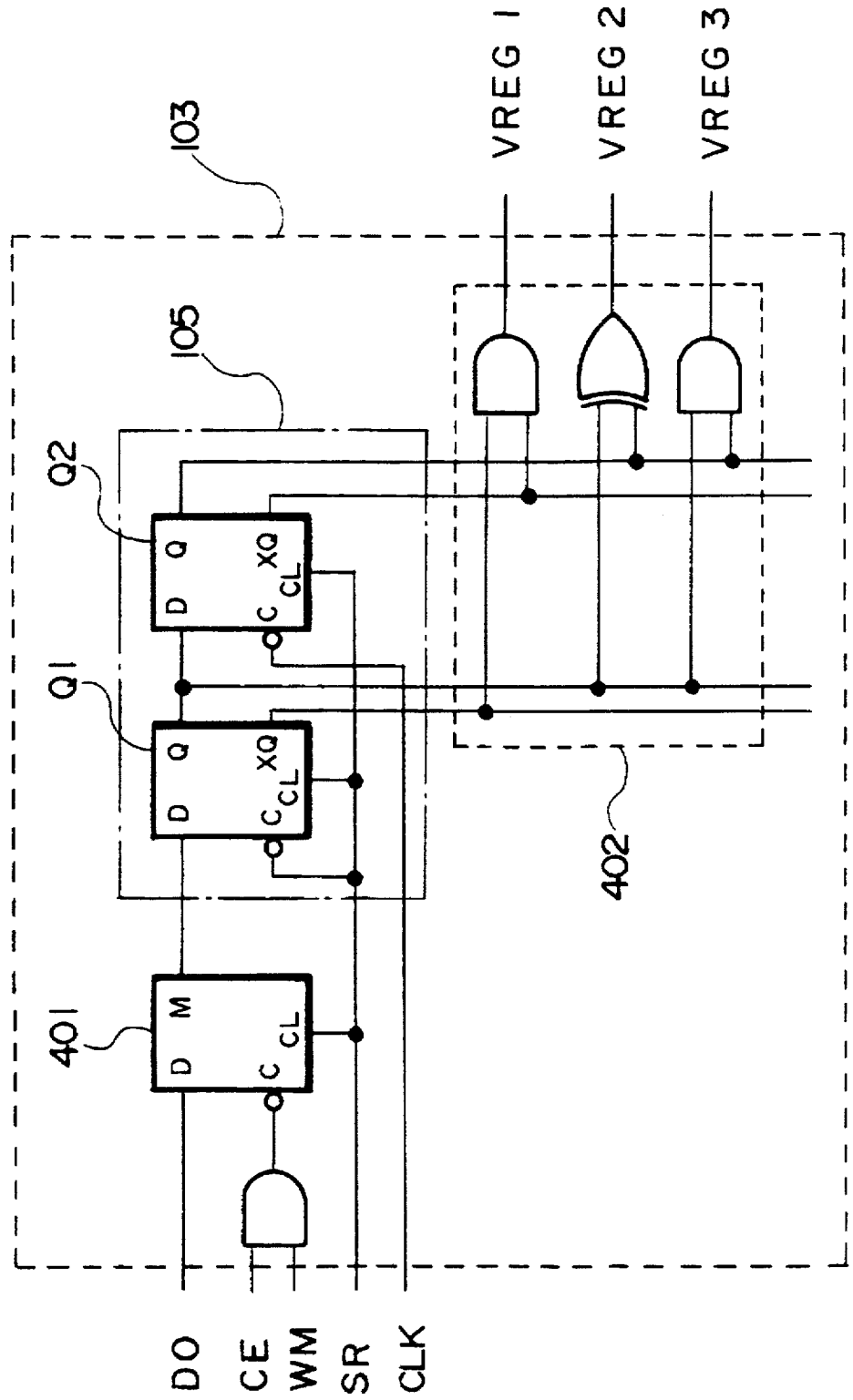
FIG. 8 shows a specific configurational example of essential components implementing the microcomputer of FIG. 7.

As shown in FIG. 8, the dedicated timer 105 could be configured of D flip-flops Q1 and Q2. In this case, the elapsed-time function of the dedicated timer 105 can be adjusted by changing the period of an operating clock CLK.

Note that reference number 401 in this figure denotes a control register that corresponds to the component with reference number 302 in FIGS. 2 to 4. With the configuration of this embodiment, it is sufficient merely to set a clock-switching command, as described above, so that only one control register 401 need be provided. Reference number 402 denotes a decoder circuit that corresponds to the component with reference number 303 in FIGS. 2 to 4.

Figure 9:
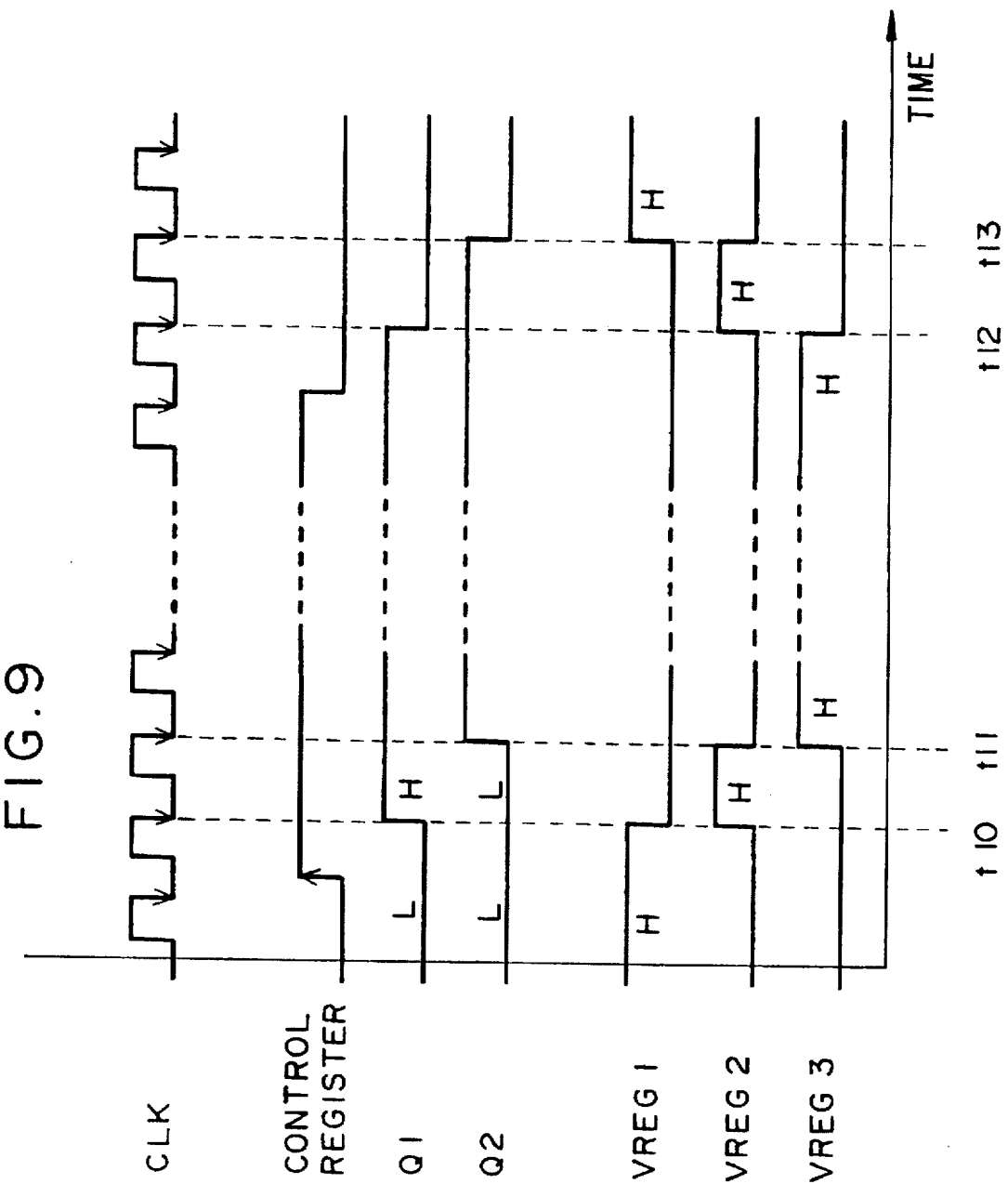
FIG. 9 is a timing chart of the operation of the microcomputer of FIG. 8.

A timing chart illustrating the operation of the circuitry of FIG. 8 is shown in FIG. 9.

Figure 7:
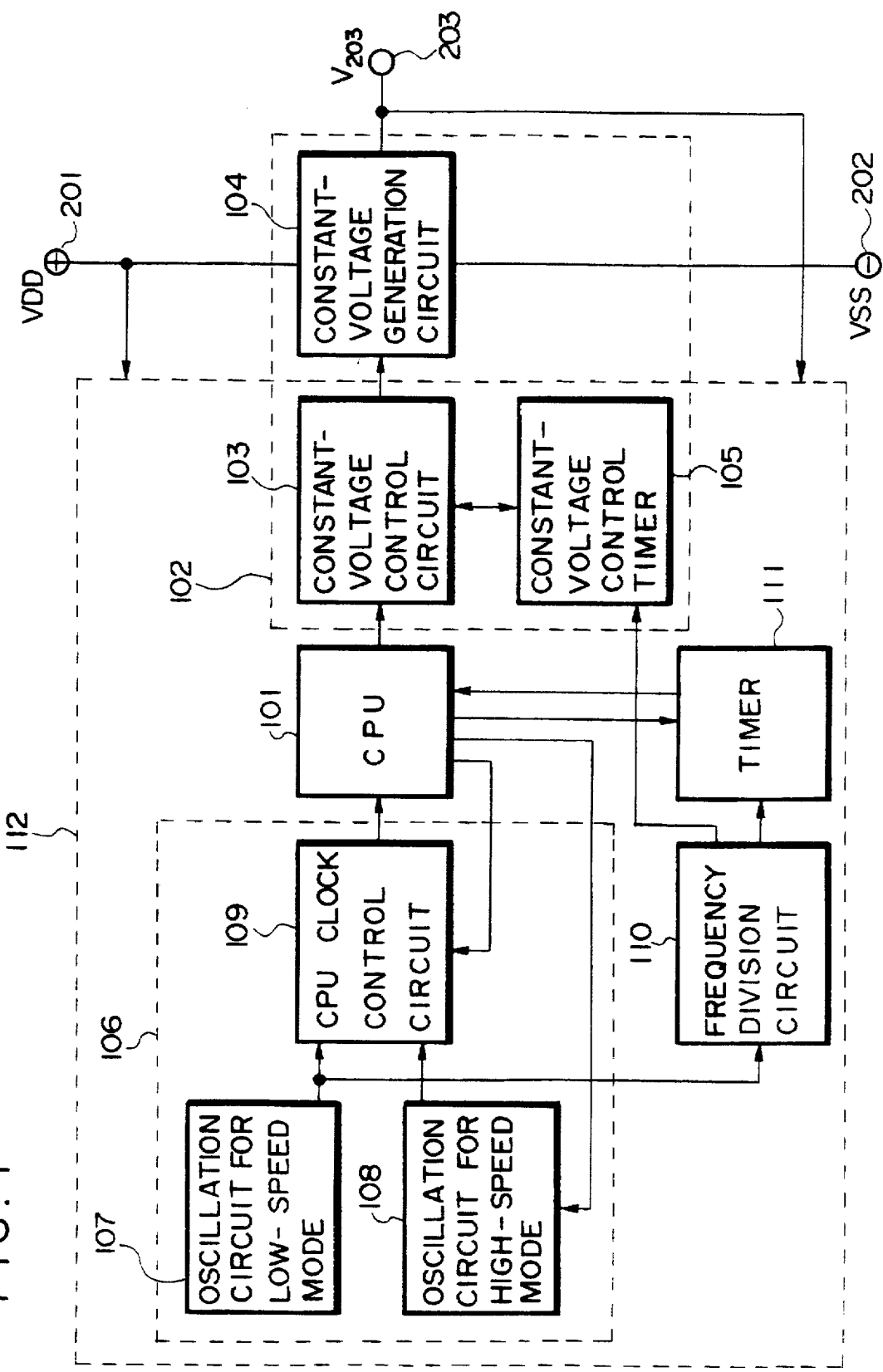
FIG. 7 is a block diagram of a second embodiment of this invention, giving an example of the use of a timer in the control of the microcomputer.

If the contents of the control register 401 of FIG. 7 are set to high (=1) by the CPU 101, that data is input to the constant-voltage control timer 105. That data is shifted to the D flip-flops Q1 and Q2 in synchronization with the clock CLK of the timer 105. In other words, the output of the D flip-flop Q1 goes high at a time t10, then the output of the D flip-flop Q2 goes high at a time t11.

In consequence, the levels of VREG1, VREG2, and VREG3, which are constant-voltage control signals, change at these times t10 and t11. AS a result, the control signals are generated in the same manner as that shown in FIG. 5, and thus the internal power supply potential $V_{203}$ is switched in a stepwise manner.

If the contents of the control register 401 of FIG. 7 are set to low (=0) by the CPU 101, the levels of the constant-voltage control signals VREG1, VREG2, and VREG3 change sequentially at times t12 and t13 in a similar manner, and the internal power supply potential $V_{203}$ is switched in a stepwise manner.

The time required for the level of the internal power supply potential $V_{203}$ to be switched in this stepwise manner can be adjusted by varying the period (frequency) of the clock CLK to be input to the dedicated timer 105 as appropriate. Note that this clock (CLK) could be the frequency-divided clock of the frequency division circuit 110 of FIG. 1.

As described above, this embodiment makes it unnecessary for the CPU 101 to repeatedly set data in a control register to determine the constant-voltage levels. This not only reduces the load on the CPU 101, it also prevents erroneous register setting and thus prevents abrupt changes in the internal power voltage.

Note that, if no dedicated timer is provided, the general-purpose timer 111 shown in FIG. 1 could be used instead.

Third Embodiment

Figure 10:
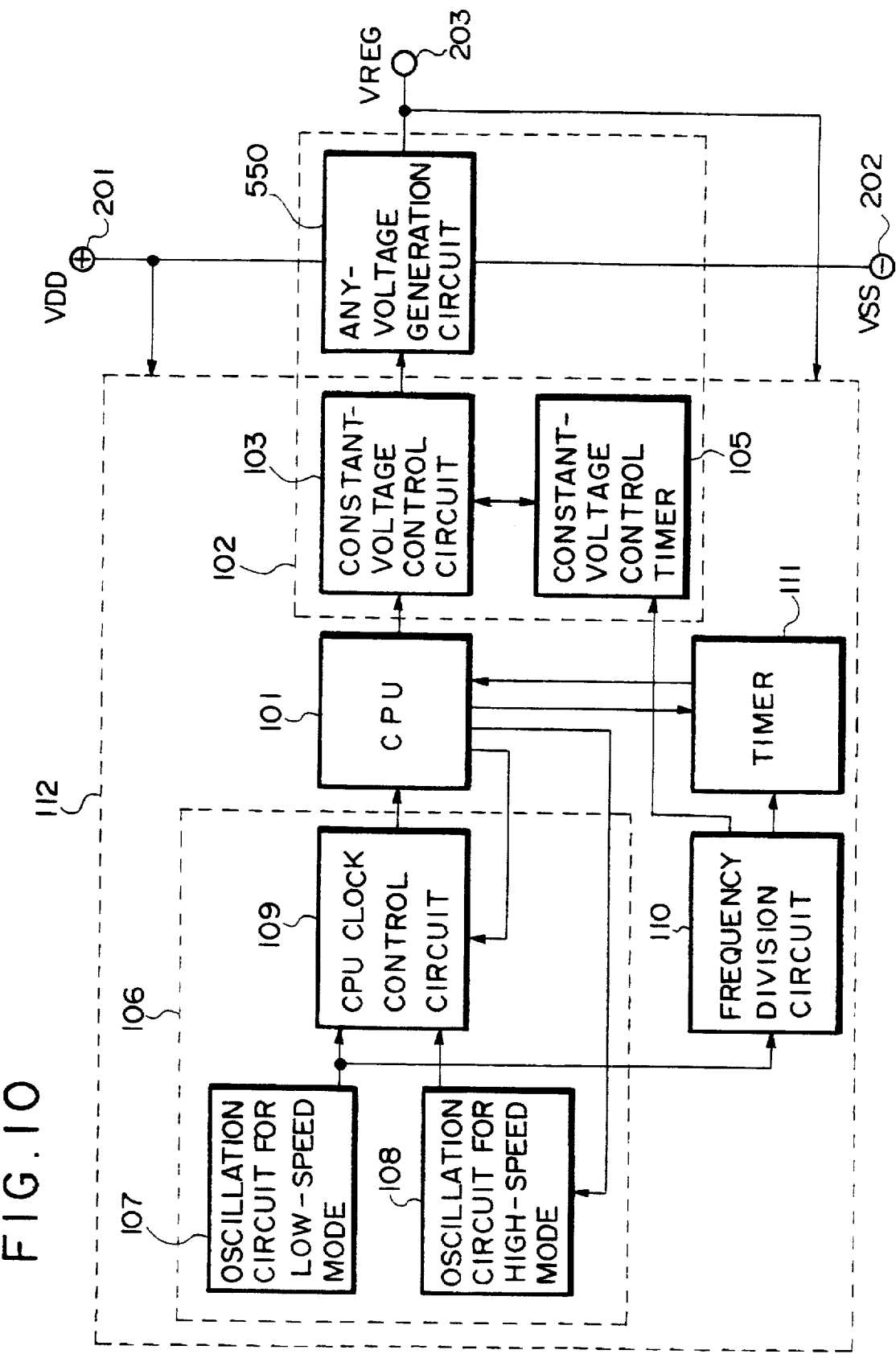
FIG. 10 is a block diagram of a third embodiment of this invention, giving an example of how the internal power voltage of the microcomputer can be adjusted to any desired value.

A third embodiment of this invention will now be described, with reference to FIG. 10.

This embodiment is characterized in that an any-voltage generation circuit 550 is provided in the constant-voltage circuit 102 so that the output voltage can be set to any desired level.

Figure 11:
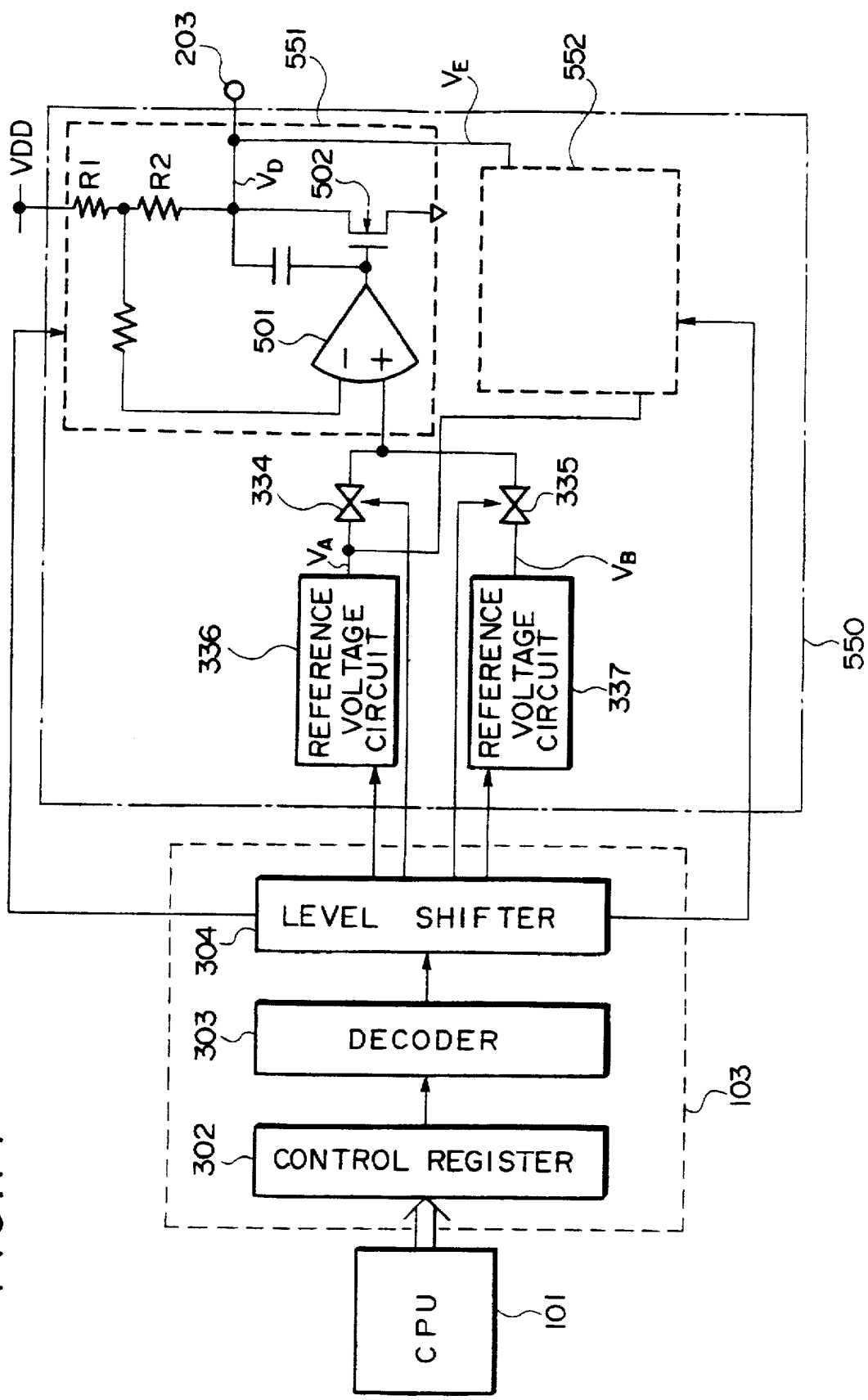
FIG. 11 shows a specific configurational example of essential components of the microcomputer of FIG. 10.

As shown in FIG. 11, the any-voltage generation circuit 550 could be implemented by replacing the buffer circuits 338 and 339 of the configuration shown in FIG. 3 with negative-feedback amplifiers 551 and 552.

In other words, if it is assumed that the input to a non-inverting terminal (+) of a differential pair circuit 501 shown in FIG. 11 is $V_A$, the internal power supply potential $V_{203}$ generated at the terminal 203 can be expressed by the following Equation 4:

$$V_{203} = V_A \cdot (1 + R2/R1) \qquad \ldots (4)$$

This means that the level of the internal power supply potential $V_{203}$ can be set as desired by adjusting the resistances of the negative-feedback resistors R1 and R2 from the outside.

Figure 12:
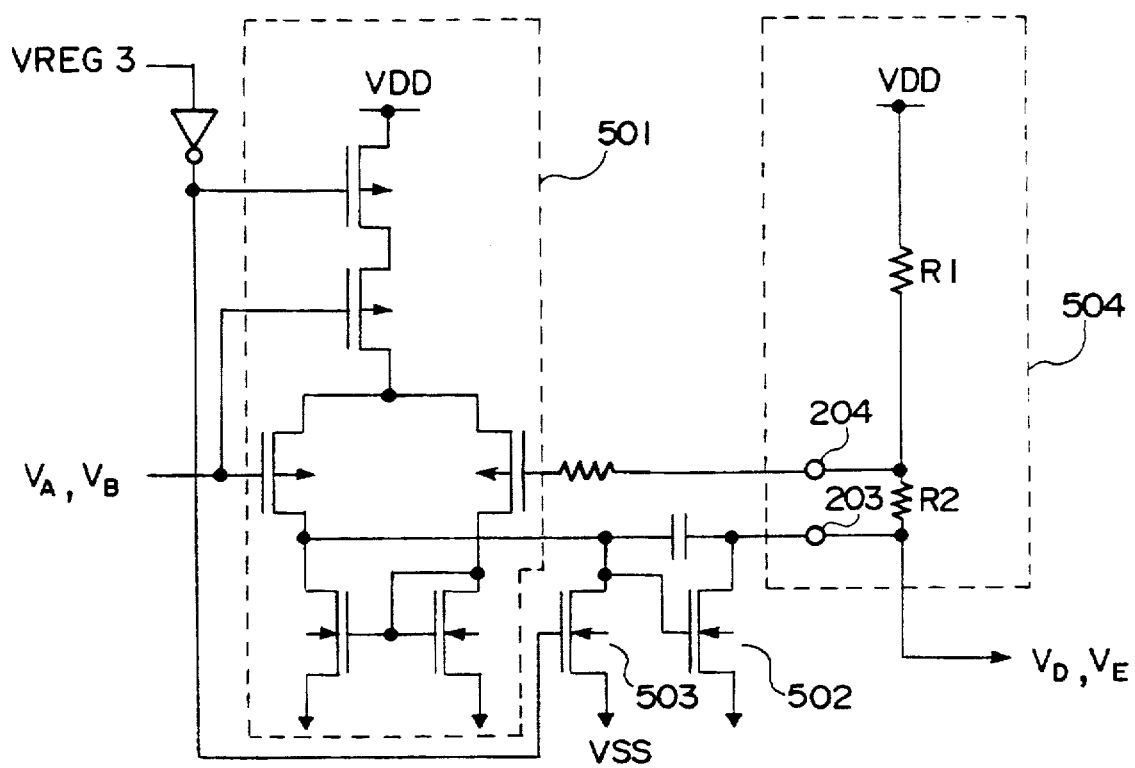
FIG. 12 shows a specific configurational example of an essential component (output buffer) of the microcomputer of FIG. 11.

A specific configurational example of the negative-feedback amplifier 551 (or 552) of FIG. 11 is shown in FIG. 12. The resistance of the resistor R1 (or R2) can be adjusted from outside by a configuration in which the differential pair circuit 501 is separated from a negative-feedback resistor section 504, and the negative-feedback resistor section 504 is attached externally by terminals 203 and 204.

In this manner, the level of the internal power supply potential $V_{203}$ can be set to any desired value in accordance with the resistance of the externally attached resistor. This makes it possible to conform with the oscillation frequency when the CPU is operating in high-speed mode, and also determine the level of $V_{203}$ as appropriate. Since this enables the microcomputer to cope with a wide range of oscillation frequencies, the microcomputer can be used in a wider range of applications.

Note that this embodiment is configured in such a manner that the resistance of an externally attached resistor is adjusted, but the present invention is not limited thereto. For example, a number of resistors for internal adjustment could be incorporated within the circuit, and the gain of an op-amp could be adjusted by selecting one of these resistors by a control signal applied through a control terminal.

Fourth Embodiment

A fourth embodiment of this invention will now be described with reference to FIG. 13.

This embodiment is characterized in that a constant-voltage control circuit 103' in the constant-voltage circuit 102 not only switches the levels of the control signals VREG1, VREG2, and VREG3 of the internal power supply potential $V_{203}$ in a stepwise manner, it also turns on and off the oscillation circuit 108 for high-speed mode and switches the clock for the CPU clock control circuit 109, in an interlocking fashion.

Figure 13:
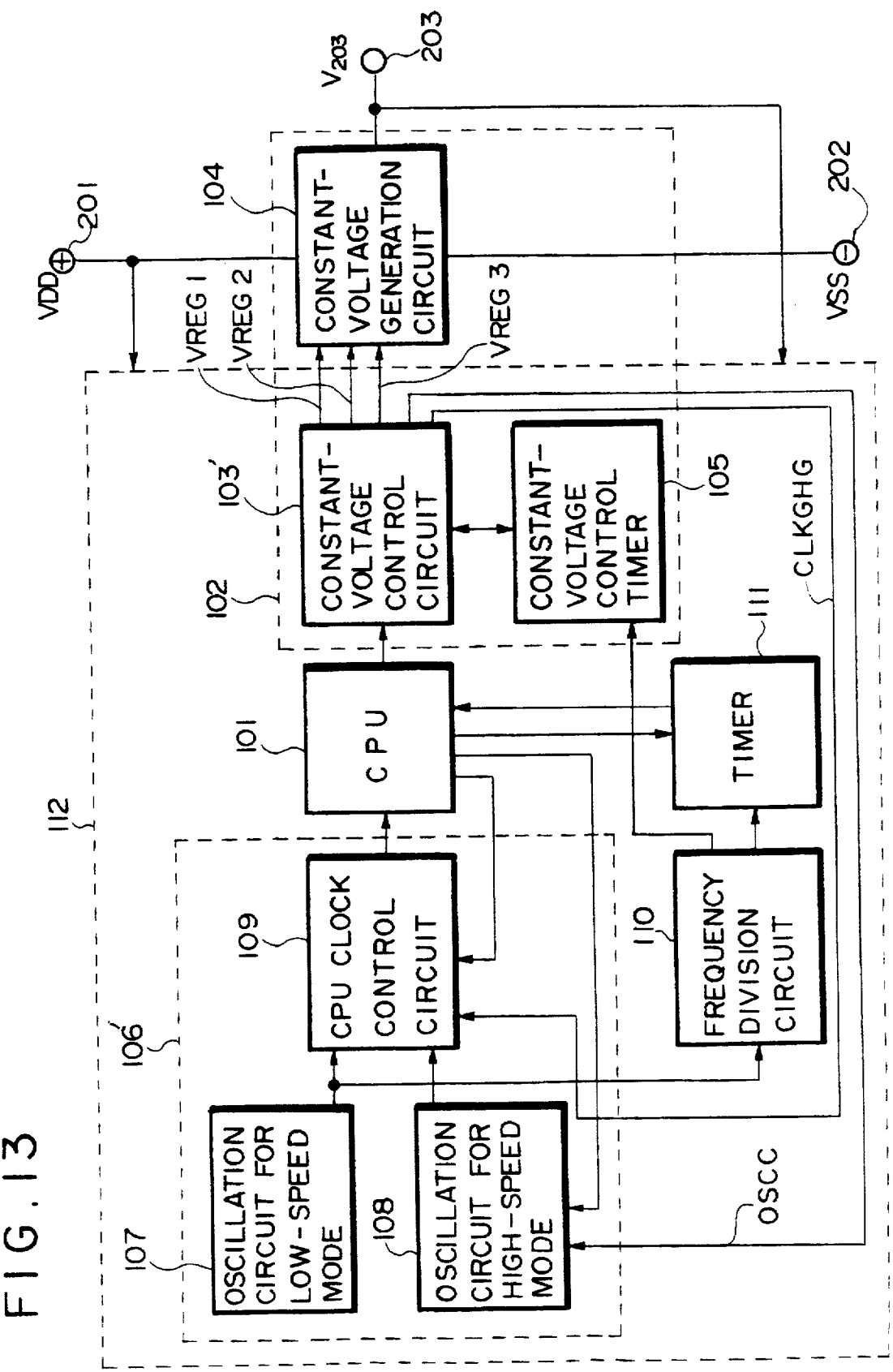
FIG. 13 is a block diagram of a fourth embodiment of this invention, giving an example of how overall control of the microcomputer is performed by the control circuit.

In FIG. 13, OSCC denotes a control signal for controlling the turning on and off of the oscillation circuit 108 for high-speed mode and CLKCHG denotes for selecting either the low-speed clock or the high-speed clock for the CPU clock control circuit 109.

Figure 14:
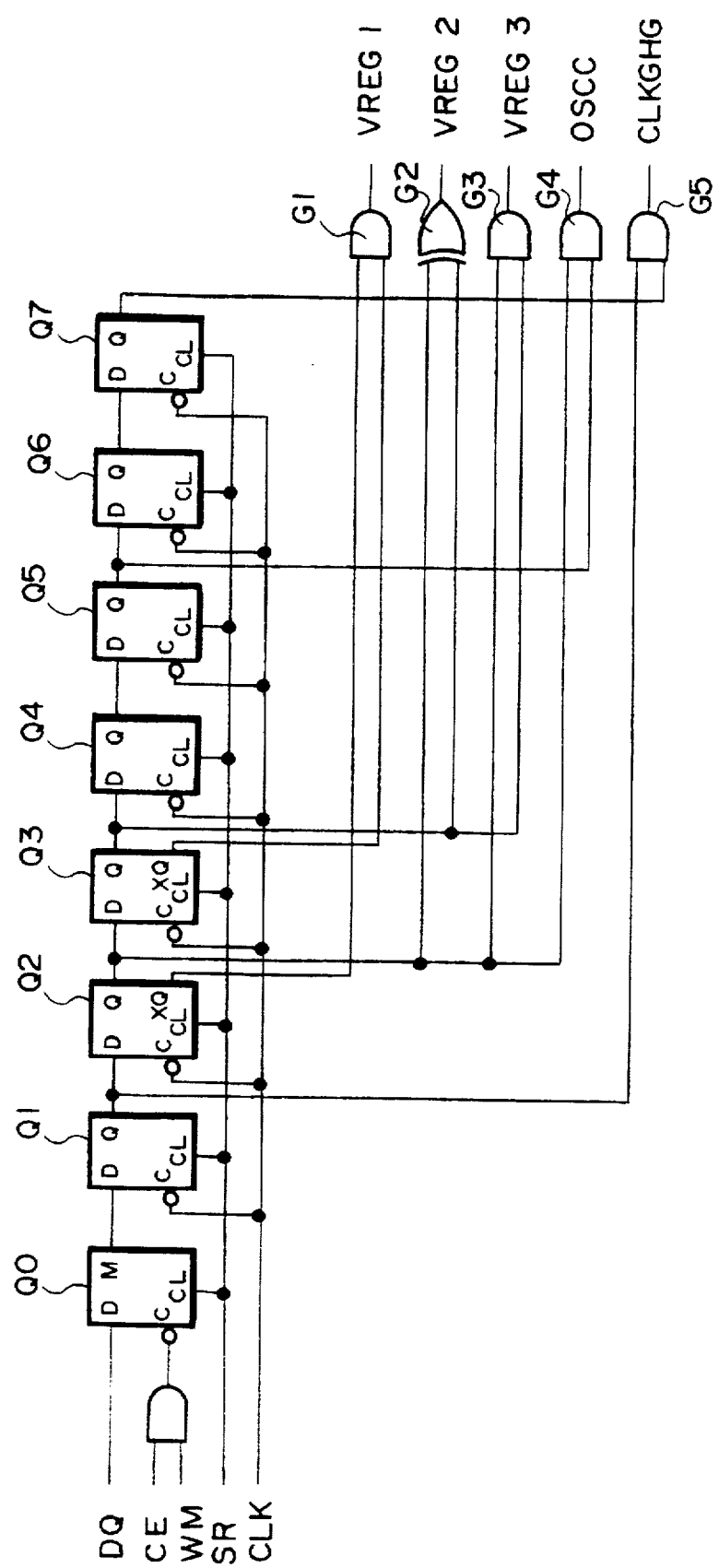
FIG. 14 shows a specific configurational example of essential components of the microcomputer of FIG. 13.

A configurational example of the constant-voltage control circuit 103' for outputting all the control signals VREG1, VREG2, VREG3, OSCC, and CLKCHG in an interlocking manner is shown in FIG. 14.

As shown in FIG. 14, the constant-voltage control circuit 103' could be configured by a combination of shift registers consisting of D flip-flops Q0 to Q7 and decoder circuits consisting of gates G1 to G5.

Figure 15:
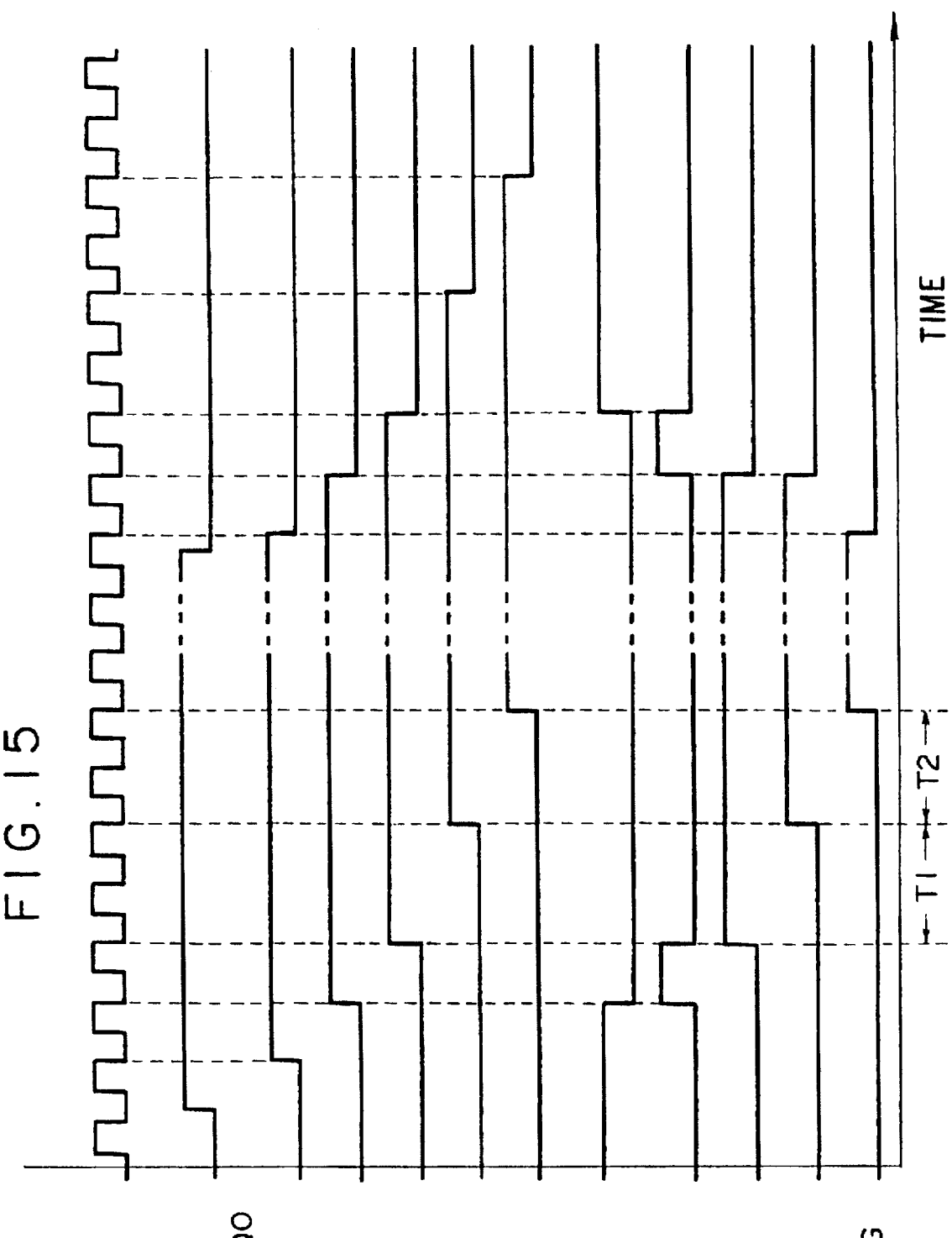
FIG. 15 is a timing chart illustrative of the operation of the electronic circuitry of FIG. 14.

The changes in output voltage of each of the D flip-flops Q0 to Q7 are shown in FIG. 15, together with the timing at which the control signals VREG1, VREG2, VREG3, OSCC, and CLKCHG are generated.

In FIG. 15, T1 denotes the time required for the level of $V_{203}$ to stabilize and T2 denotes the time required for the oscillation of the oscillation circuit 108 for high-speed mode to stabilize. Both T1 and T2 are on the order of 1 ms.

There would be no problem if the length of T1 were shortened, or even if it were removed completely, but T2 always has to be guaranteed.

A specific configurational example of the oscillation circuit 108 for high-speed mode together with the CPU clock control circuit 109 in the oscillation circuit 106' of FIG. 13 will now be described with reference to FIG. 16.

The oscillation circuit 108 for high-speed mode uses a ceramic oscillator 601, with the configuration being such that the phase of an oscillation output at a terminal TA is inverted by a CMOS inverter (INV) and is fed back to the oscillator 601 through a terminal TB.

Figure 16:
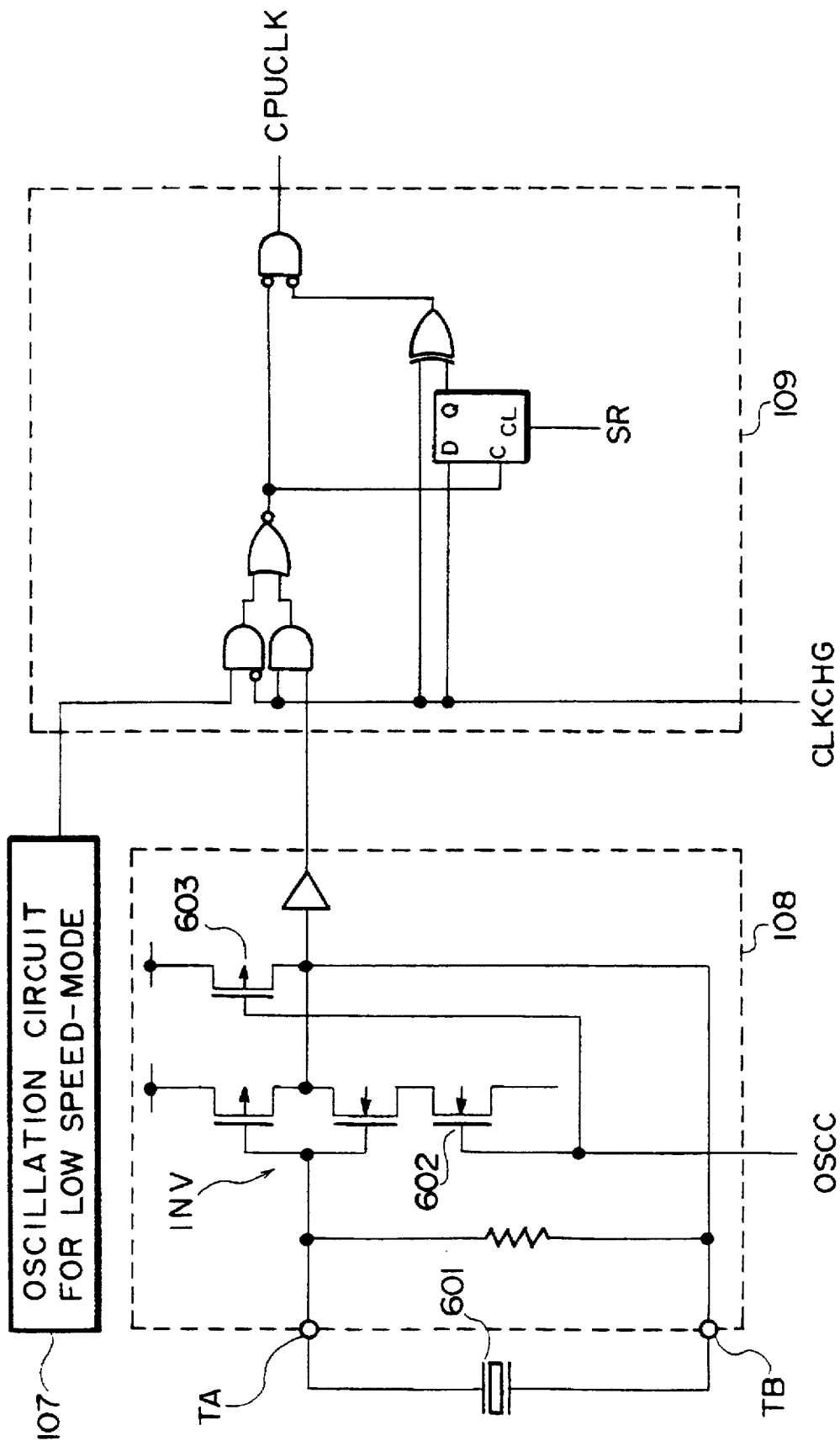
FIG. 16 shows a specific example of the oscillation circuits and peripheral circuitry used in the microcomputer of FIG. 13.

An NMOS transistor 602 and a PMOS transistor 603 in FIG. 16 control the turning on and off of the oscillation operation. In other words, the gates of the NMOS transistor 602 and the PMOS transistor 603 are driven by the above described control signal OSCC. The high-speed clock is output when the NMOS transistor 602 is turned on, but the oscillation is halted when the PMOS transistor 603 is turned on so that the high-speed clock is not output.

The CPU clock control circuit 109 shown in FIG. 16 is configured in such a manner that it receives the low-speed clock from the oscillation circuit 107 for low-speed mode and the high-speed clock from the oscillation circuit 108 for high-speed mode, then selects and outputs one of these clocks depending on the level of the control signal CLKCHG. This output clock (CPUCLK) is supplied to the CPU 101 of FIG. 13.

The above configuration makes it possible for the entire series of control (the stepwise switching of the level of the internal power supply potential $V_{203}$, the stopping and starting of the high-speed mode oscillation, and the switching of the CPU clock) to be performed automatically by hardware.

This ensures that the clock that is used is always matched with the power voltage that is used. This not only reduces the load on the CPU 101; it also removes the danger of the occurrence of erroneous procedures by the software.

Figure 17:
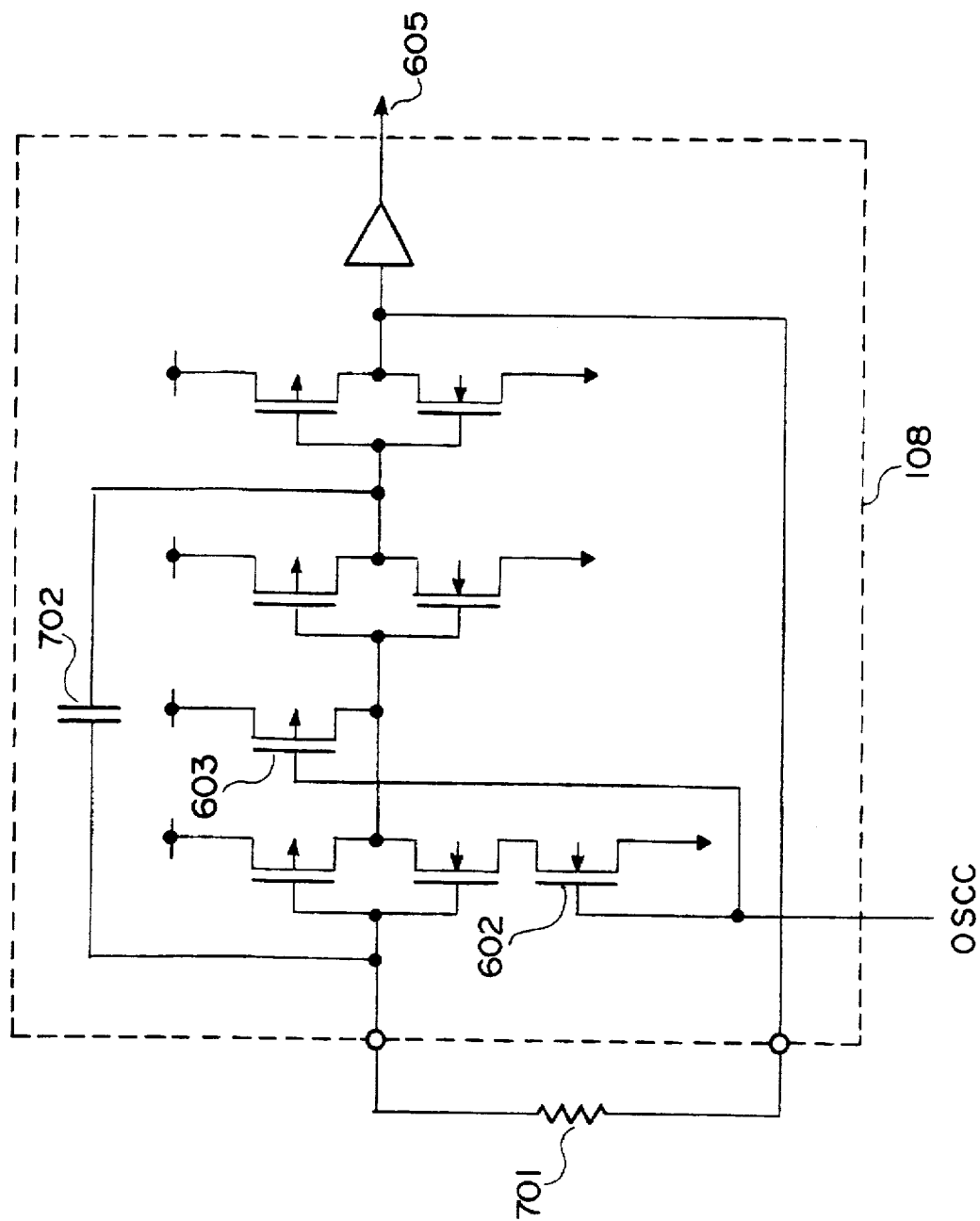
FIG. 17 shows another specific example of the oscillation circuits and peripheral circuitry used in the microcomputer of FIG. 13.

Note that, other than the ceramic oscillator of FIG. 16, an RC oscillation circuit (an oscillation circuit using a resistor 701 and a capacitor 702) shown in FIG. 17 could be used as the oscillation circuit 108 for high-speed mode.

The above description referred to a configuration having a plurality of oscillation circuits, and the voltage of one of the oscillation circuits was varied. Note, however, that the present invention is not limited thereto; it could equally well implemented by a configuration having a single oscillation circuit and switching between the low-speed operating mode and the high-speed operating mode is provided by varying the oscillation frequency thereof.

The power supply of the oscillation circuit for low-speed mode in the above example was made common with that of the oscillation circuit for high-speed mode, but the present invention should not be limited thereto. In other words, if the oscillation characteristics of the oscillation circuit for low-speed mode should become a problem when a high voltage is applied, a constant power voltage could be supplied constantly to the low-speed mode oscillation circuit.

Fifth Embodiment

Various examples of electronic equipment incorporating the above described microcomputer of this invention will now be described with reference to FIGS. 18 to 21.

Figure 18:
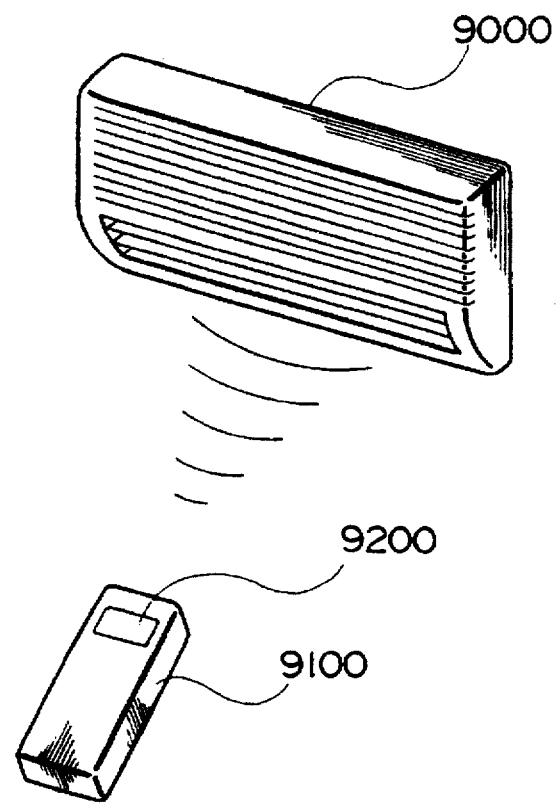
FIG. 18 is an external view of the controller of an air-conditioner that is an example of electronic equipment in accordance with this invention.

In FIG. 18, the microcomputer of this invention is incorporated within a remote controller 9100 of an air-conditioner. This controller 9100 is designed to control an air-conditioner 9000 and is capable of displaying an operating status on a liquid crystal display device 9200.

Figure 19:
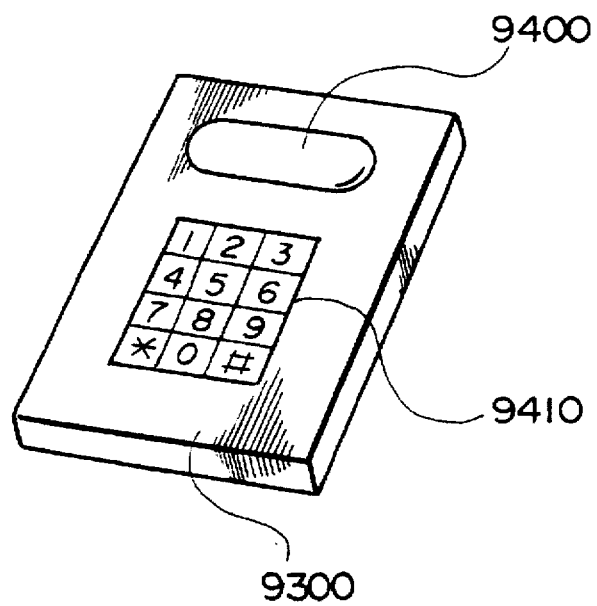
FIG. 19 is an external view of a calculator that is another example of electronic equipment in accordance with this invention.

In FIG. 19, the microcomputer of this invention is incorporated within a calculator 9300. This calculator 9300 has input keys 9410 and a liquid crystal display device 9400.

Figure 20:
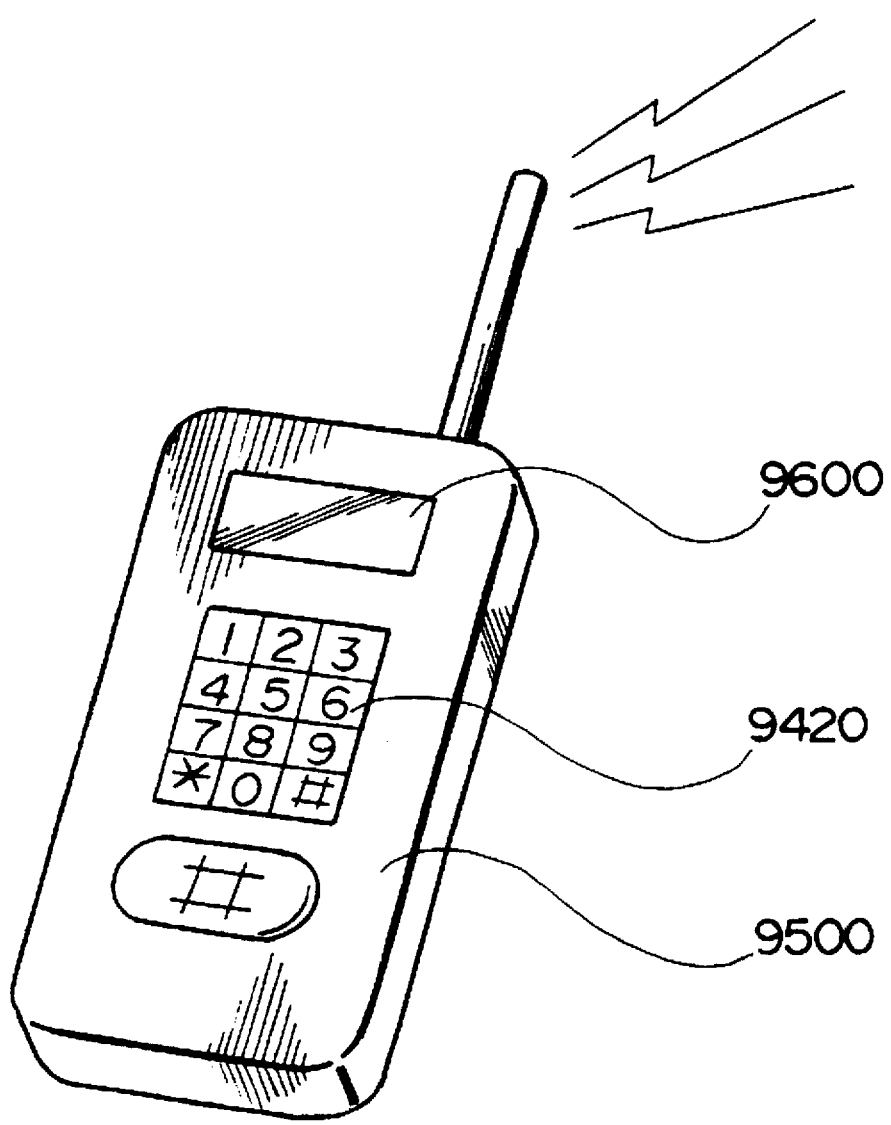
FIG. 20 is an external view of a portable telephone that is a further example of electronic equipment in accordance with this invention.

In FIG. 20, the microcomputer of this invention is incorporated within a portable telephone 9500. This portable telephone 9500 also has input keys 9420 and a liquid crystal display device 9600.

Each of the above examples of electronic equipment is a portable device that uses batteries (including solar batteries).

Figure 21:
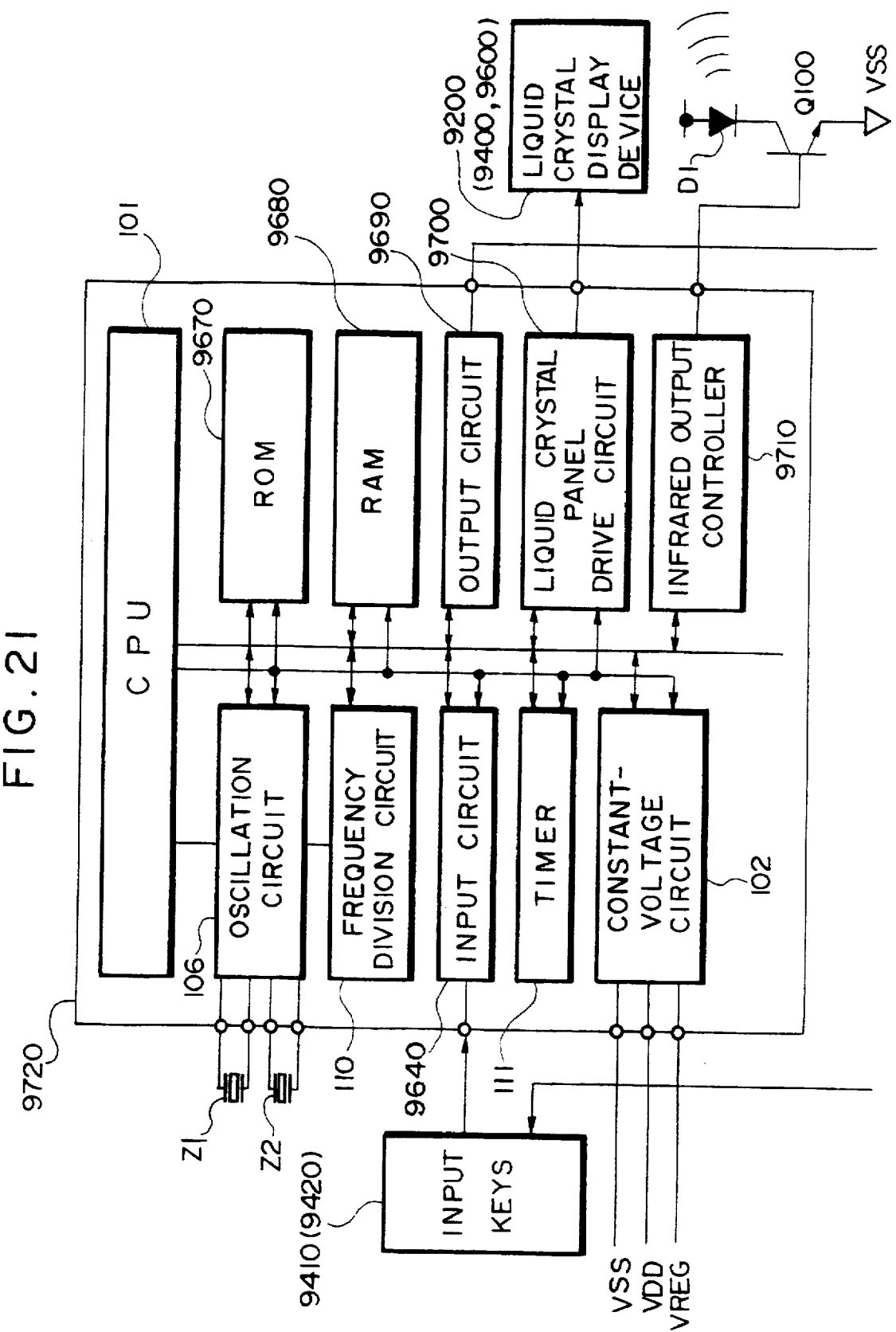
FIG. 21 shows a specific configurational example of the electronic circuitry for control that is used in the embodiments of FIGS. 18 to 20.

An outline of the overall configuration of a microcomputer in accordance with this invention when incorporated in one of the above examples of electronic equipment is shown in FIG. 21. The microcomputer 9720 shown in FIG. 21 is incorporated within the remote controller for an air-conditioner as shown in FIG. 18, but it can equally well be applied to the electronic equipment of FIG. 19 or FIG. 20.

In addition to the functional blocks shown in FIG. 1, the microcomputer 9720 of FIG. 21 is provided with an input circuit 9640, an output circuit 9690, a ROM 9670, a RAM 9680, a liquid crystal panel drive circuit 9700, and an infrared output controller 9710.

The input circuit 9640 and output circuit 9690 act as communications interface circuit between the microcomputer and external devices such as the input keys 9410 or 9420. The liquid crystal panel drive circuit 9700 drives the liquid crystal display device 9200, 9400, or 9600 to implement a time display or appropriate types of status display. The infrared output controller 9710 drives an infrared-emitting diode D1 to turn it on or off, through a switching transistor Q100.

When the microcomputer 9720 of this invention is driving the infrared-emitting diode D1 to turn it on or off, a high-speed clock signal (such as one created with the use of a ceramic oscillator Z1) is used as the clock of the CPU 101. When it is simply displaying something on the liquid crystal panel, a low-speed clock signal (such as one created with the use of another ceramic oscillator Z2) is used.

When the high-speed clock signal is being used, high-speed operation of the CPU 101 is enabled by the use of the high-level power voltage; when the low-speed clock signal is being used, a reduction in power consumption can be enabled by using the low-level power voltage. When the level of the power voltage is switched, a stepwise switching is performed, as described above, which prevents errors such as erroneous operations.

In the above example, control was achieved by transmitting infrared rays, but a similar effect could be obtained when this invention is applied to a calculator.

That is, if there is no key input to the calculator, the operation uses an oscillation clock for low-speed mode; if the keys are being used, calculation processing is performed by using a high-speed clock from an oscillator for high-speed mode.

With the above configuration, high-speed operation of the CPU 101 using a high-level power voltage is enabled when a high-speed clock is used, but it is possible to reduce the power consumption by using a low-level power voltage when a low-speed clock is used. In addition, stepwise switching is used when the level of the power voltage is switched, so that malfunctions such as erroneous operation of the circuitry are prevented.

In this manner, both a reduced power consumption and fast processing speeds can be achieved while maintaining reliability, in various different types of electronic equipment in accordance with the present invention.

Sixth Embodiment

Figure 22:
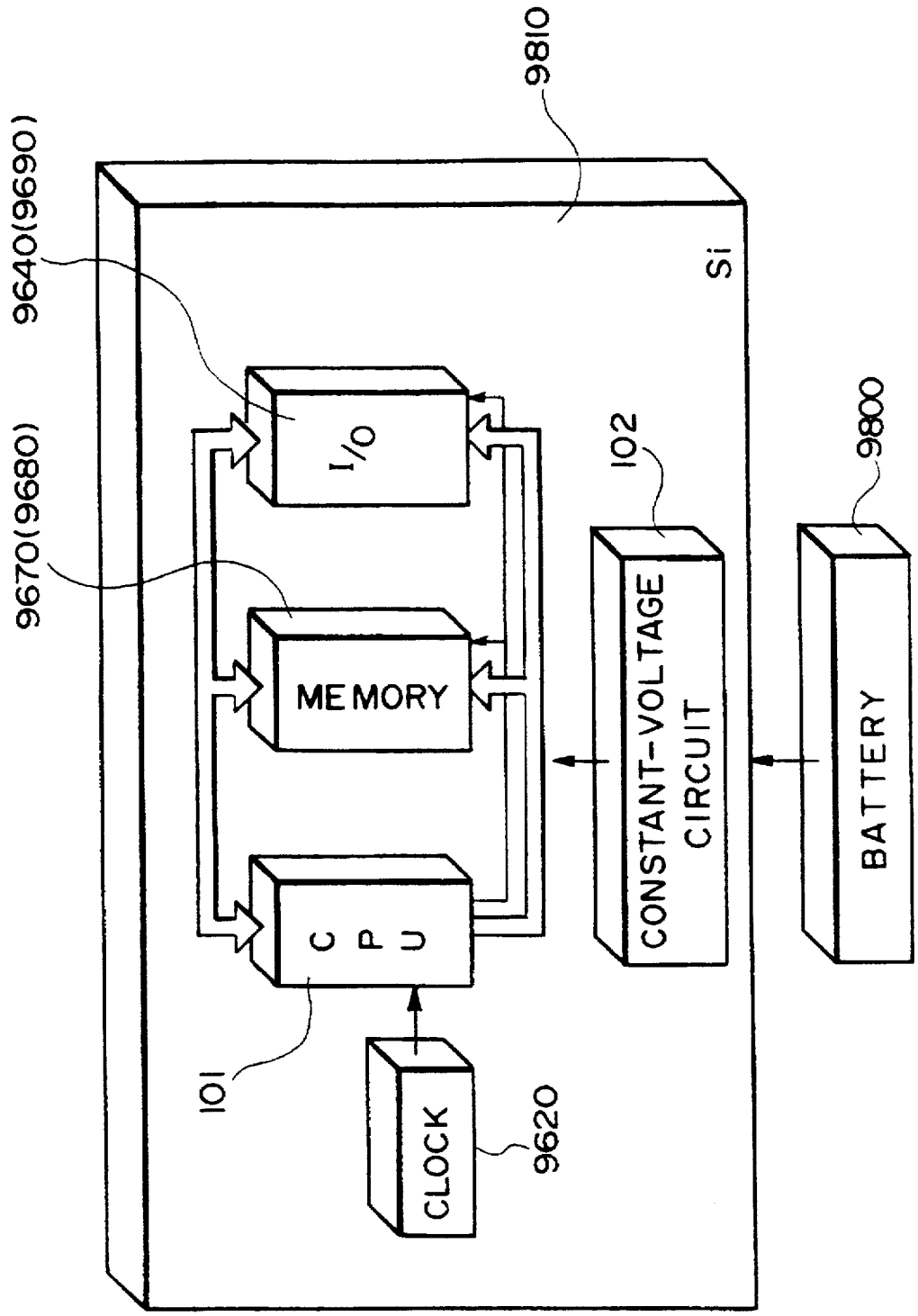
FIG. 22 shows an example of a semiconductor device in accordance with this invention.

The microcomputer 9720 of FIG. 21 could be implemented as a semiconductor device in such a manner that components such as the CPU 101 are integrated on a single silicon chip 9810, as shown in FIG. 22.

Seventh Embodiment

Figure 23:
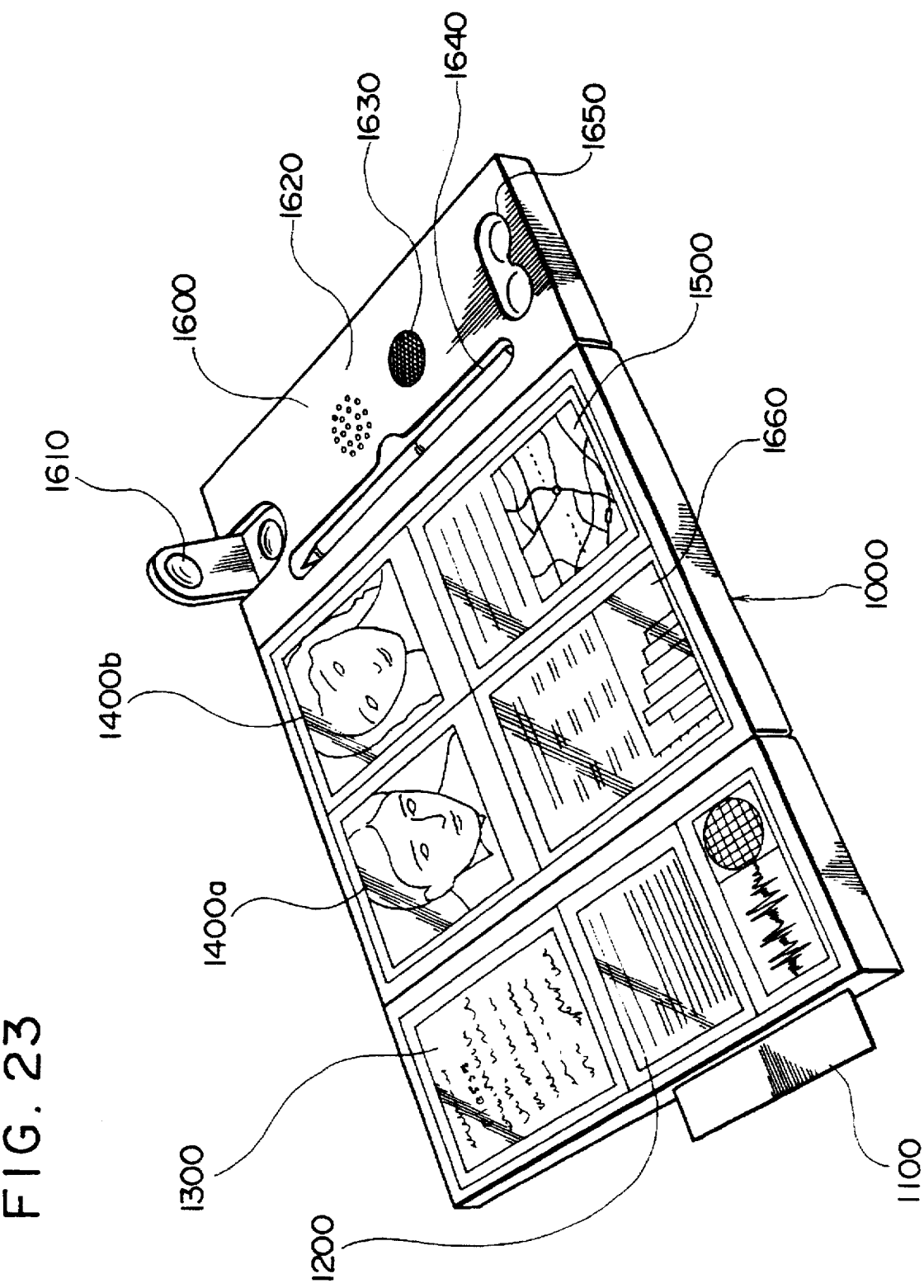
FIG. 23 is an external view of a multimedia information terminal that is another example of electronic equipment in accordance with this invention.

An external view of a personal, portable type of information terminal 1000 to which the present invention is applied is shown in FIG. 23.

This information terminal 1000 comprises an IC card 1100, a simultaneous interpretation system 1200, a screen 1300 for handwriting, a television conference system 1400a and 1400b, a map information system 1500, and a liquid crystal display screen 1660.

The information terminal 1000 also comprises a video camera 1610, a speaker 1620, a microphone 1630, an input pen 1640, and an earphone 1650 in an I/O inter face unit 1600.

Figure 24:
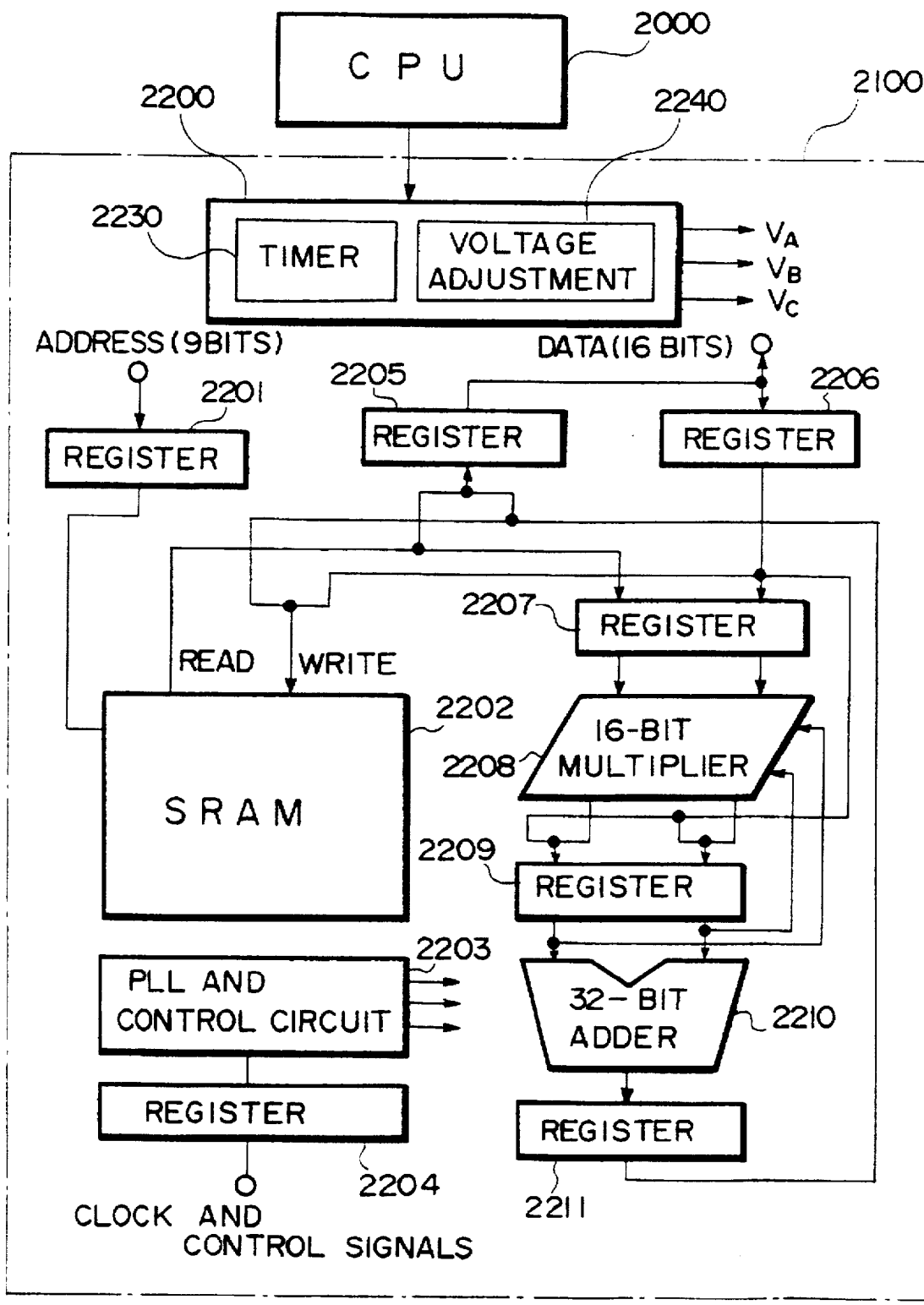
FIG. 24 shows a configurational example of a digital signal processor (DSP) incorporated into the electronic equipment of FIG. 23.

A digital signal processor (DSP) 2100 shown in FIG. 24 is used in this personal, portable type of information terminal 1000.

Registers 2201, 2205, and 2206 and an SRAM 2202, which are circuits within the DSP 2100, are likely to suffer from the effects of inversion of stored data when the power voltage is being switched, in the same manner as with the above described microcomputer.

Figure 25:
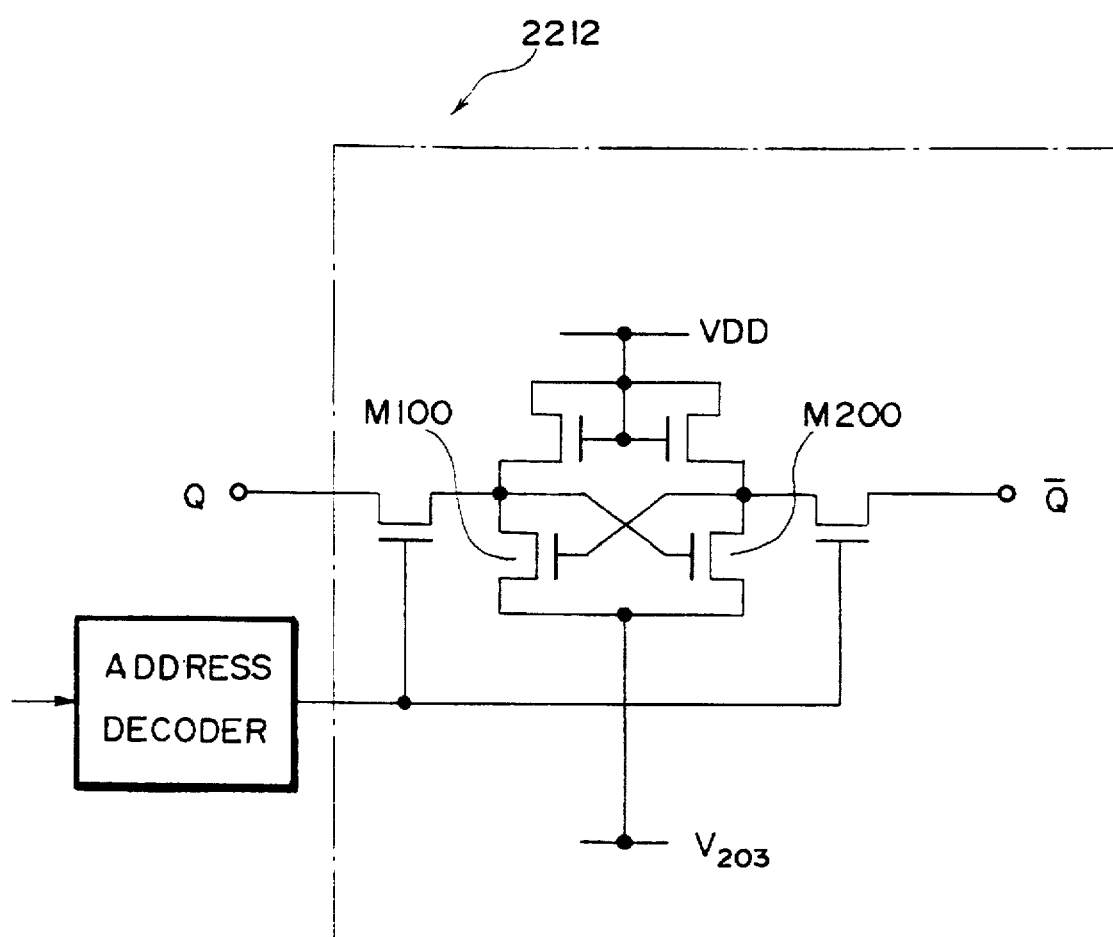
FIG. 25 shows the circuit configuration of a memory cell in the SRAM of FIG. 24.

An SRAM memory cell 2212 taken as an example has flip-flops configured of MOS transistors M100 and M200, as shown in FIG. 25.

If it is assumed that the internal power supply potential $V_{203}$ is switched, the switching of the gate potentials of the MOS transistors M100 and M200 might be delayed with respect to switching of the threshold voltages thereof, which could destroy stored data. The above described stepwise switching of the internal power supply potential $V_{203}$ is also effective in preventing this problem.

Figure 26:
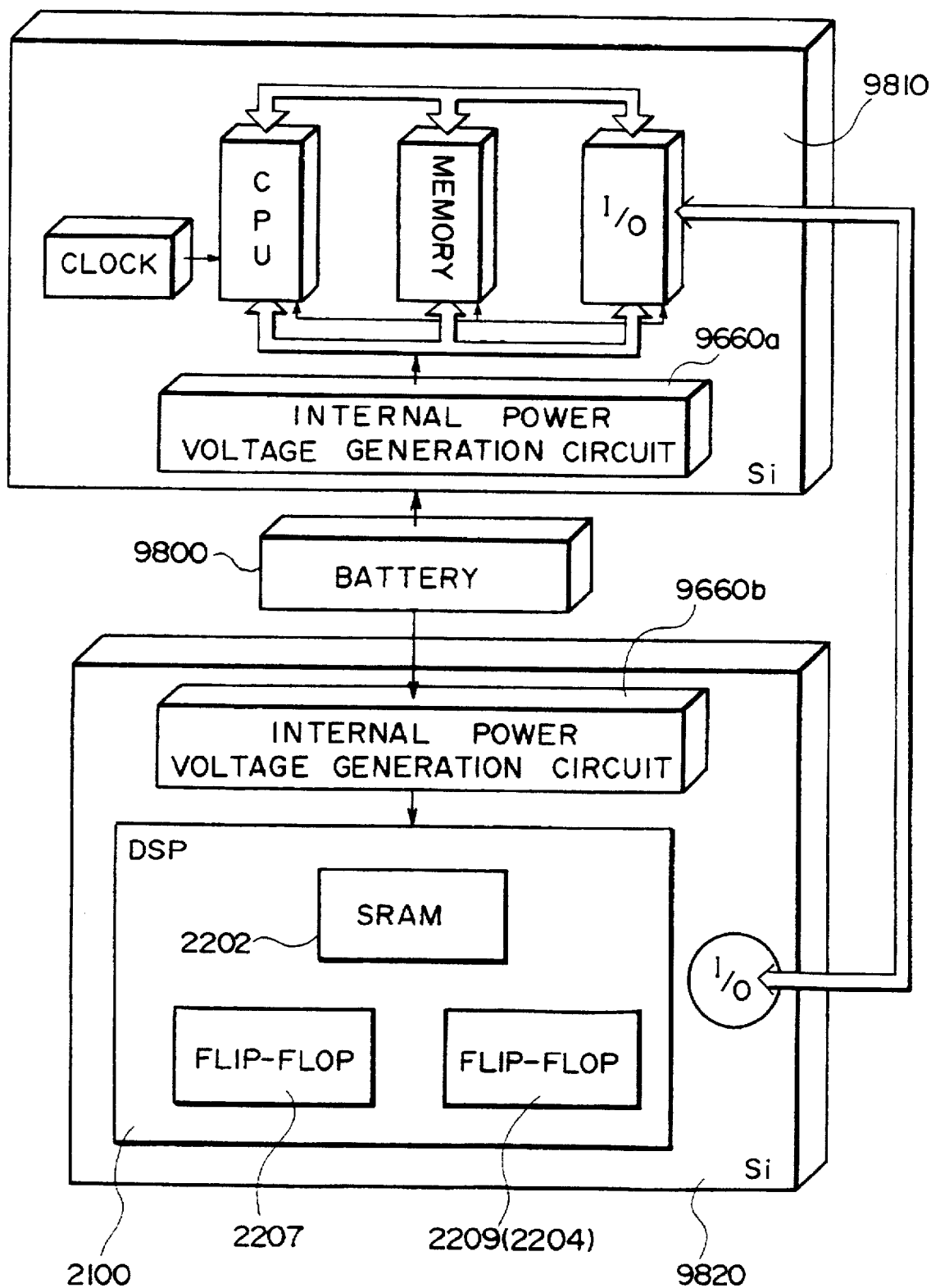
FIG. 26 shows an example of a semiconductor device in accordance with this invention.

As shown in the lower part of FIG. 26, the DSP 2100 of FIG. 24 could be implemented as a semiconductor device by integrating the circuitry thereof into a silicon chip 9820. It could then be connected to a microcomputer that has been implemented as a semiconductor device, such as the one shown in FIG. 22, by a bus. The configuration shown in FIG. 26 is such that internal power voltage generation circuits 9660a and 9660b sequentially generate the internal power supply potential $V_{203}$ with differing levels.

In this manner, this invention can be applied to an entire semiconductor device that is capable of switching the power voltage.

In general, the response speed of elements in a semiconductor device increases as the power voltage increases. That is why it might be necessary to increase the power voltage in a special operating mode, in order to increase the response speed of individual semiconductor elements within the semiconductor device without changing the oscillation frequency of the oscillation circuit. In this case too, an intermediate potential can be provided by a process of varying the power voltage, and thus malfunctions and erroneous operations can be prevented by varying the potential in a stepwise manner.

What is claimed is:

1. A semiconductor device which can change a power voltage of at least part of said semiconductor device, comprising:

a constant-voltage circuit for generating said power voltage, which comprises voltage generation means for generating at least first, second, and third voltages, wherein the absolute value of said first voltage is set to be less than the absolute value of said second voltage, and the absolute value of said second voltage is set to be less than the absolute value of said third voltage, wherein;

said constant-voltage circuit further comprises control means for said voltage generation means such that, when switching from said first voltage to said third voltage, or from said third voltage to said first voltage is performed, said second voltage is generated before said switching to said first or third voltage is performed, thus implementing stepwise voltage switching.

2. A semiconductor device as defined in claim 1, wherein said control means for said voltage generation means uses a timer means to provide timing control for said stepwise voltage switching.

3. A semiconductor device as defined in claim 1, wherein said voltage generation means in said constant-voltage circuit comprises adjustment means for adjusting said first, second, and third voltages to any desired values.

4. A semiconductor device for selecting and using as the power voltage thereof a first power voltage and a second power voltage of an absolute value less than that of said first power voltage, comprising:

a voltage generation circuit for generating said first power voltage, said second power voltage, and a constant voltage of a potential intermediate between those of said first power voltage and said second power voltage; and first and second gate circuits mutually connected by signal transmission paths and each capable of operating equally well under said first power voltage and said second power voltage; wherein during a switching of power voltage to said first and second gate circuits from said first power voltage to said second power voltage or from said second power voltage to said first power voltage, a stepwise switching of power voltage is performed by generating the constant voltage of intermediate potential before switching to said first or second power voltage.

5. A semiconductor device as defined in claim 4, wherein said first and second gate circuits are configured of insulated-gate field-effect transistors and each of said gate circuits has a threshold voltage that varies depending on power voltage; and wherein:

the value of at least one of said threshold voltages is substantially that of said first or second power voltage.

6. A semiconductor device as defined in claim 4, wherein the device can operate in at least first and second operating modes, the first operating mode giving priority to a low power consumption and the second operating mode giving priority to high-speed operation or the driving of a large load, and wherein;

as a power voltage in at least part of said semiconductor device, said second power voltage is used in said operating mode that gives priority to a low power consumption, and the first power voltage is used in said operating mode that gives priority to high-speed operation or the driving of a large load.

7. A semiconductor device as defined in claim 4, further comprising control circuitry for portable electronic equipment that uses a battery, wherein the control circuitry is integrated on a semiconductor chip.

8. A microcomputer comprising:
- a clock output circuit for outputting a first clock and a second clock of a frequency lower than that of said first clock;
- a central processing unit (CPU) operating by using either of said first and second clocks output by said clock output circuit;
- a voltage generation circuit for generating a first power voltage, a second power voltage of an absolute value less than that of said first power voltage, and a constant voltage of a potential intermediate between those of said first power voltage and said second power voltage; and
- a control circuit for controlling operation of said voltage generation circuit; wherein:
    said control circuit controls operation of said voltage generation circuit in such a manner that stepwise switching of a power voltage occurs such that, when said CPU is operating using said first clock, said first power voltage is generated from said voltage generation circuit; when said CPU is operating using said second clock, said second power voltage is generated from said voltage generation circuit; and when switching between said first power voltage and said second power voltage is being performed, said constant voltage of intermediate potential is first generated before switching to said first or second power voltage.

9. A microcomputer as defined in claim 8, wherein said control circuit comprises a register for setting an instruction from said CPU that specifies voltage to be generated, and a decoder for decoding an output signal from said register and supplying an output from said decoder to said voltage generation circuit;
- said voltage generation circuit comprises at least two constant-voltage circuits provided with differential pair circuits using insulated-gate field-effect transistors and at least two buffer circuits to which outputs of said constant-voltage circuits are input;
- at least one of said buffer circuits has an offset between the input and output thereof; and
- a number of constant voltages of differing levels that is greater than the number of constant-voltage circuits is generated by passing constant voltages of differing levels output from each of said constant-voltage circuits not only unchanged through said buffers, but also with said offset added to said constant voltages, and said constant voltages are selectively output as power voltages corresponding to decoder outputs of said decoder.

10. A microcomputer as defined in claim 8, wherein said control circuit is provided with a timer means, and stepwise voltage switching is performed when said control circuit receives a voltage-switching instruction from said CPU, by using said timer means to cause the generation of a series of timing control signals for stepwise voltage switching and output said signals to said voltage generation circuit, thus causing the generation of predetermined voltages from said voltage generation circuit at a predetermined spacing.

11. A microcomputer as defined in claim 10, wherein said timer means is configured of a shift register that operates in accordance with a control clock signal.

12. A microcomputer as defined in claim 8, wherein said voltage generation circuit is provided with adjustment means for adjusting the values of generated voltages.

13. A microcomputer as defined in claim 12, wherein said voltage generation circuit is provided with a constant-voltage circuit and a negative-feedback amplification circuit that receives an output from said constant-voltage circuit, and said adjustment means for adjusting the values of generated voltages comprises means for changing in the resistance of a feedback resistor of said negative-feedback amplification circuit.

14. A microcomputer comprising:
- a clock output circuit provided with a first oscillation circuit for generating a first clock, a second oscillation circuit for generating a second clock of a frequency lower than that of said first clock, and a clock selection circuit for selecting and outputting said first or second clock on the reception of a clock select signal;
- a central processing unit (CPU) operating by using said first or second clock output by said clock output circuit;
- a voltage generation circuit for generating a first power voltage for operations using said first clock, a second power voltage of an absolute value less than that of said first power voltage for operations using said second clock, and a constant voltage of a potential intermediate between those of said first power voltage and said second power voltage; and
- a control circuit for providing control such that, on receiving an instruction from said CPU indicating that clock-switching is to be performed, said control circuit generates a control signal for said voltage generation circuit and said clock select signal, and causes stepwise switching of said power voltage and clock switching by applying said signals to said voltage generation circuit and said clock selection circuit, respectively.

15. A microcomputer as defined in claim 14, wherein said control circuit is configured of a shift register that operates in accordance with a control clock.

16. A microcomputer as defined in claim 14, wherein said CPU inputs said instruction indicating that clock-switching is to be performed by executing one command from a program, and thereafter said control circuit autonomously executes a series of operations for performing said voltage switching and clock switching.

17. A microcomputer as defined in claim 14, wherein, on receiving said instruction from said CPU indicating that clock-switching is to be performed, said control circuit generates and outputs oscillation control signals for controlling the generation or non-generation of clock signals from said first oscillation circuit or second oscillation circuit, in addition to said control signal for said voltage generation circuit and said clock select signal.

18. A microcomputer as defined in claim 14, wherein said microcomputer is used in the control of portable electronic equipment that utilizes a battery.

19. An electronic equipment including a semiconductor device which can change a power voltage of at least part of the semiconductor device, comprising:
- a constant-voltage circuit for generating said power voltage, which comprises voltage generation means for generating at least first, second, and third voltages, wherein the absolute value of the first voltage is set to be less than the absolute value of the second voltage, and the absolute value of the second voltage is set to be less than the absolute value of the third voltage, wherein;
- the constant-voltage circuit further comprises control means for the voltage generation means such that, when switching from the first voltage to the third voltage, or from the third voltage to the first voltage is performed, the second voltage is generated before the switching to the first or third voltage is performed, thus implementing stepwise voltage switching.

20. Electronic equipment as defined in claim 19, wherein the electronic equipment is portable and has a battery as a power supply.

21. Electronic equipment as defined in claim 19, wherein said semiconductor device operates on an internal power voltage generated within said electronic equipment, and the internal power voltage has a level lower than an output voltage of a battery.

22. Electronic equipment as defined in claim 19, wherein the equipment is a personal information terminal that is portable and includes a liquid crystal display device.

23. An electric equipment including a microcomputer, comprising:

a clock output circuit for outputting a first clock and a second clock of a frequency lower than that of the first clock;

a central processing unit (CPU) operating by using either of the first and second clocks output by the clock output circuit;

a voltage generation circuit for generating a first power voltage, a second power voltage of an absolute value less than that of the first power voltage, and a constant voltage of a potential intermediate between those of the first power voltage and the second power voltage; and a control circuit for controlling operation of the voltage generation circuit, wherein;

the control circuit controls operation of the voltage generation circuit in such a manner that stepwise switching of a power voltage occurs such that, when the CPU is operating using the first clock, the first power voltage is generated from the voltage generation circuit; when the CPU is operating using the second clock, the second power voltage is generated from the voltage generation circuit; and when switching between the first power voltage and the second power voltage is being performed, the constant voltage of intermediate potential is first generated before switching to the first or second power voltage.

24. Electronic equipment as defined in claim 23, wherein the electronic equipment is portable and uses a battery as a power supply.

25. Electronic equipment as defined in claim 23, wherein said microcomputer operates on an internal power voltage generated within said electronic equipment, of a level lower than an output voltage of a battery.

26. Electronic equipment as defined in claim 23, wherein the equipment is a personal information terminal that is portable and includes a liquid crystal display device.

* * * * *